United States Patent
Gu et al.

(10) Patent No.: US 10,668,573 B2
(45) Date of Patent: Jun. 2, 2020

(54) PREPARATION AND APPLICATION OF PB-FREE NANOSOLDER

(71) Applicant: University of Massachusetts, Boston, MA (US)

(72) Inventors: Zhiyong Gu, Chelmsford, MA (US); Fan Gao, Lowell, MA (US); Evan Wernicki, Templeton, MA (US); Jonathan Campelli, Burlington, MA (US)

(73) Assignee: University of Massachusetts, Boston, MA (US)

( * ) Notice: Subject to any disclaimer, the term of this patent is extended or adjusted under 35 U.S.C. 154(b) by 222 days.

(21) Appl. No.: 15/540,968

(22) PCT Filed: Jan. 11, 2016

(86) PCT No.: PCT/US2016/012810
§ 371 (c)(1),
(2) Date: Jun. 29, 2017

(87) PCT Pub. No.: WO2016/112375
PCT Pub. Date: Jul. 14, 2016

(65) Prior Publication Data
US 2017/0368643 A1 Dec. 28, 2017

Related U.S. Application Data

(60) Provisional application No. 62/101,803, filed on Jan. 9, 2015.

(51) Int. Cl.
*B23K 35/00* (2006.01)
*C22C 13/00* (2006.01)
(Continued)

(52) U.S. Cl.
CPC ............ *B23K 35/262* (2013.01); *B23K 35/00* (2013.01); *B23K 35/02* (2013.01); *B23K 35/025* (2013.01);
(Continued)

(58) Field of Classification Search
CPC .. B23K 35/025; B23K 35/262; B23K 35/362; B23K 1/0016; B23K 35/0244
See application file for complete search history.

(56) References Cited

U.S. PATENT DOCUMENTS

| 7,022,266 B1 * | 4/2006 | Craig ..................... C09D 11/52 |
| | | 148/24 |
| 2005/0113476 A1 * | 5/2005 | Akiyama ............. C09D 11/101 |
| | | 522/1 |

(Continued)

*Primary Examiner* — Erin B Saad
(74) *Attorney, Agent, or Firm* — Milstein Zhang & Wu LLC

(57) ABSTRACT

The preparation and use of particulate metallic solder alloy having particles of a single chemical composition is described. The particles of the particulate metallic solder alloy have a bimodal size distribution in which particles in a smaller size range have a largest dimension that is smaller than a smallest dimension of particles in a larger size range of the bimodal distribution. In some examples the particles in the smaller size mode have dimensions in the range of 1 to 100 nm. In some examples, the particles in the larger size mode have dimensions in the range of 2 to 75 microns in dimension. In some examples, a halogen-free flux is used. In some examples, a solvent is used to make a paste.

3 Claims, 31 Drawing Sheets

Flux  Solder

(51) Int. Cl.
*B23K 35/26* (2006.01)
*B23K 35/02* (2006.01)
*B23K 35/22* (2006.01)
*B23K 35/36* (2006.01)
*B23K 35/30* (2006.01)
*H01R 43/02* (2006.01)
*C22C 13/02* (2006.01)

(52) U.S. Cl.
CPC ...... *B23K 35/0222* (2013.01); *B23K 35/0244* (2013.01); *B23K 35/22* (2013.01); *B23K 35/26* (2013.01); *B23K 35/264* (2013.01); *B23K 35/30* (2013.01); *B23K 35/3006* (2013.01); *B23K 35/3013* (2013.01); *B23K 35/36* (2013.01); *B23K 35/3601* (2013.01); *C22C 13/00* (2013.01); *C22C 13/02* (2013.01); *H01R 43/02* (2013.01)

(56) References Cited

U.S. PATENT DOCUMENTS

| | | | |
|---|---|---|---|
| 2009/0152331 A1* | 6/2009 | Schmitt | B23K 35/3612 228/256 |
| 2009/0274834 A1* | 11/2009 | Chopra | C09D 11/52 427/125 |
| 2013/0082095 A1* | 4/2013 | Ho | H05K 3/3489 228/224 |

* cited by examiner

FIG. 9A
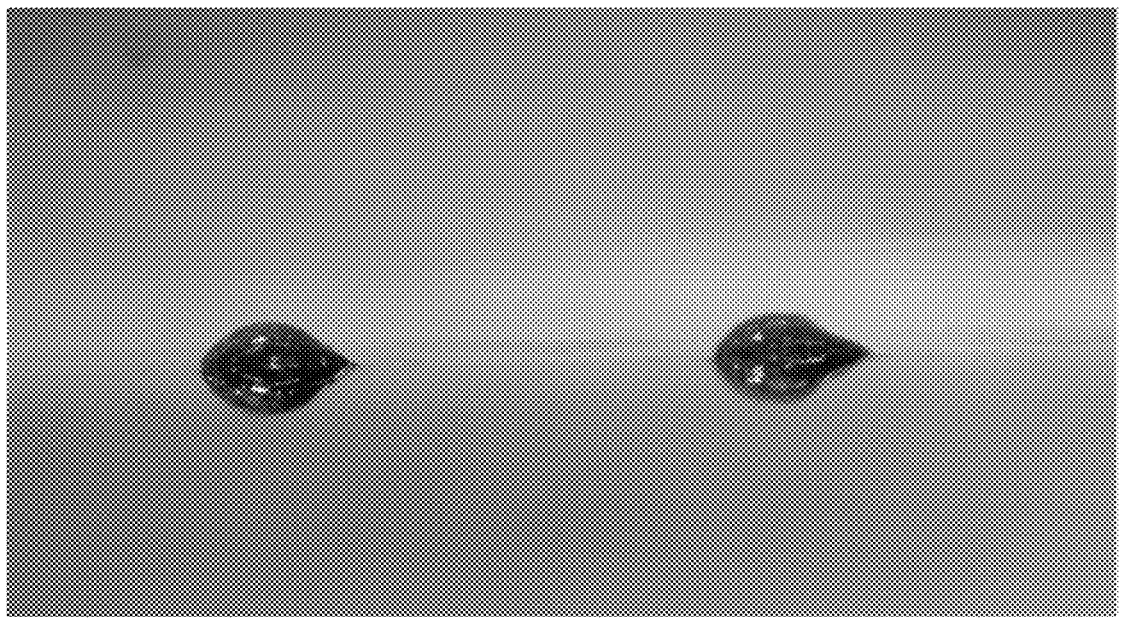
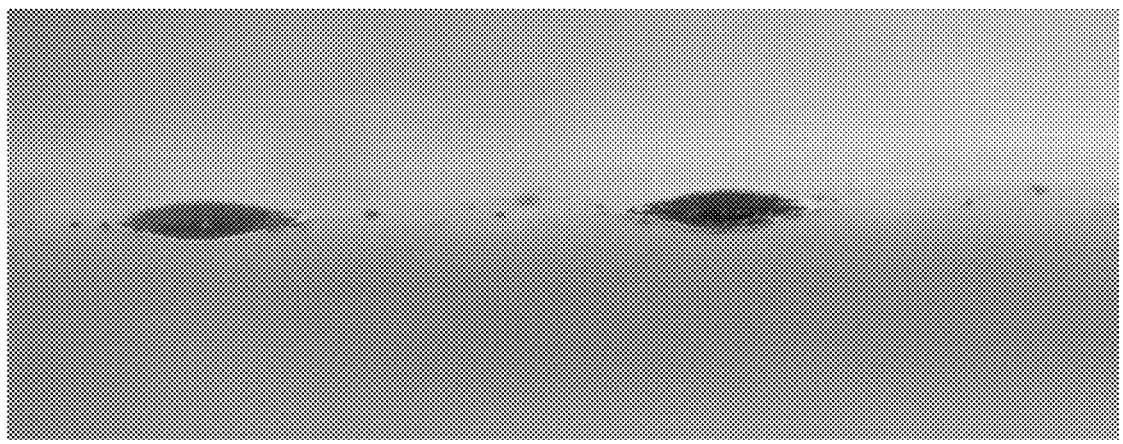
FIG. 9B

PREPARATION AND APPLICATION OF PB-FREE NANOSOLDER

CROSS-REFERENCE TO RELATED APPLICATIONS

This application is the U.S. national phase of and claims priority to PCT/US16/12810, filed Jan. 11, 2016, which claims the benefit of priority to U.S. Provisional Application Ser. No. 62/101,803, filed on Jan. 9, 2015, the entire content of each of which is incorporated herein by reference in its entirety.

STATEMENT REGARDING FEDERALLY FUNDED RESEARCH OR DEVELOPMENT

This invention was made with government support under Grant SU835710 awarded by the Environmental Protection Agency, and under Grant CMMI-1234532 awarded by the National Science Foundation. The government has certain rights in the invention.

FIELD OF THE INVENTION

The invention relates to solder materials in general and particularly to solders that comprise microparticles and nanoparticles.

BACKGROUND OF THE INVENTION

Solders and soldering techniques are widely used in electronics manufacturing, including electronics assembly and packaging. Solder paste is one of the main forms of solder materials used in industry to bond and assemble electronic components of various types into electronic devices or photonic devices. One main usage of solder paste is through a ball grid array (BGA) technique for surface mounting packaging. Solder paste is composed of two materials: solder balls (normally in the micron size) and solvents that are used to prepare the paste, which usually contains a flux that is used to clean the surface oxide of the solder balls to ensure complete solder reflow upon melting. The metallic solder balls are evenly dispersed in a paste flux that allows printing through stencil apertures that match substrate pad locations, and reflowing the printed assembly at elevated temperatures which melts and ultimately forms the joints and interconnects.

Traditionally, the most widely used solder material is eutectic tin-lead (Sn—Pb) alloy (63/37 wt %). Due to the toxicity and health concerns of lead, lead-based solders are being phased out of the electronics manufacturing processes. There have been many lead-free solder candidates, and the most widely used candidates include tin/silver/copper (Sn/Ag/Cu, also referred to as SAC), Sn/Ag, and Sn/Cu. In certain processes or products, complete replacement with lead-free solders has been achieved. However, for certain industries such as defense, aerospace and medical devices, many lead-free candidates cannot achieve the same quality as Sn—Pb solders and may lead to reliability issue. Thus these industries are currently exempted from the lead-based solders. Also, for many lead-free solders such as SAC solders, the melting points are around 220° C. or above (depending on compositions), which may lead to higher processing temperatures during electronics manufacturing and thus increased thermal stress on the circuit board.

Another significant issue for lead-free solder materials is the formation of tin whiskers, which may lead to short circuits for the electronics devices.

With the electronics industry's focus on further miniaturization and push to the "nanoelectronics" era, nanosolders are expected to play a key role in assembling nano-components (nano-building blocks) into nanoelectronics and nano-systems due to several orders smaller of solder size and potential lower melting temperature, for example, MEMS (Microelectromechanical systems) packaging and microBGA packaging.

One prior art paper by H. Jiang et al, titled "Synthesis and Thermal and Wetting Properties of Tin/Silver Alloy Nanoparticles for Low Melting Point Lead-Free Solders," which was published in *Chem. Mater.* 2007, 19, 4482-4485, and appeared online on Aug. 11, 2007, is said to describe tin/silver alloy nanoparticles with various sizes that were synthesized via a low-temperature chemical reduction method, and their thermal properties were studied by differential scanning calorimetry. The particle size dependency of the melting temperature and the latent heat of fusion was observed. The melting point was achieved as low as 194° C. when the average diameter of the alloy nanoparticles was around 10 nm. The wetting test for as-prepared 64 nm (average diameter) SnAg alloy nanoparticle pastes on a Cu surface showed the typical Cu6Sn5 intermetallic compound (IMC) formation. These low melting point SnAg alloy nanoparticles could be used for low-temperature lead-free interconnect applications.

Also known in the prior art is Arvin et al., U.S. Patent Application Publication No. 2013/0284495 A1, published Oct. 31, 2013, which is said to disclose inert nano-sized particles having dimensions from 1 nm to 1,000 nm are added into a solder ball. The inert nano-sized particles may comprise metal oxides, metal nitrides, metal carbides, metal borides, etc. The inert nano-sized particles may be a single compound, or may be a metallic material having a coating of a different material. In another embodiment of the present invention, a small quantity of at least one elemental metal that forms stable high melting intermetallic compound with tin is added to a solder ball. The added at least one elemental metal forms precipitates of intermetallic compounds with tin, which are dispersed as fine particles in the solder.

Also known in the prior art is Zinn, U.S. Pat. No. 8,834,747, issued Sep. 16, 2014, which is said to disclose compositions containing tin nanoparticles and electrically conductive particles. The tin nanoparticles can have a size below about 25 nm so as to make the compositions fusable at temperatures below that of bulk tin (m.p.=232° C.). Particularly, when the tin nanoparticles are less than about 10 nm in size, the compositions can have a fusion temperature of less than about 200° C. The compositions can contain a whisker suppressant to inhibit or substantially minimize the formation of tin whiskers after tin nanoparticle fusion. In some embodiments, the compositions contain tin nanoparticles, electrically conductive particles comprising copper particles, and a whisker suppressant comprising nickel particles. Methods for using the present compositions are also described herein. The compositions can be used as a lead solder replacement that allows rework to be performed.

There is a need for improved lead-free solders having relatively low processing temperatures.

SUMMARY OF THE INVENTION

According to one aspect, the invention features a composition of matter, comprising a particulate metallic solder alloy having particles of a single chemical composition, the particles of the particulate metallic solder alloy having a bimodal size distribution in which particles in a smaller size range have a largest dimension that is smaller than a smallest dimension of particles in a larger size range of the bimodal distribution.

In one embodiment, the particles in the smaller size range of the particulate metallic solder alloy are in the range of 1-100 nanometers.

In another embodiment, the particles in the larger size range of the particulate metallic solder alloy are in the range of 2-75 microns.

In yet another embodiment, the composition of matter further comprises a flux and a solvent, the combination of the particulate metallic solder alloy, the flux and the solvent in the form of a solder paste.

In still another embodiment, the flux is a halogen-free flux.

In a further embodiment, the particulate metallic solder alloy is present in 50 to 90 weight percent, the halogen-free flux is present in 10 to 50 weight percent, and the solvent is present in 0.1 to 5 weight percent.

In yet a further embodiment, the composition of matter further comprises a flux.

In an additional embodiment, the flux is a halogen-free flux.

In one more embodiment, the particulate metallic solder alloy is present in 50 to 90 weight percent and the halogen-free flux is present in 10 to 50 weight percent.

In still a further embodiment, the fraction of the particulate metallic solder alloy particles in the smaller size range are present in 0.5 to 10 weight percent.

In one embodiment, the particulate metallic solder alloy is a tin-silver-copper alloy.

In another embodiment, the particulate metallic solder alloy is a tin-silver alloy.

In yet another embodiment, the particulate metallic solder alloy is a tin-copper alloy.

In still another embodiment, the particulate metallic solder alloy is a tin-indium alloy.

In a further embodiment, the particulate metallic solder alloy is a tin-gold alloy.

In yet a further embodiment, the particulate metallic solder alloy is a tin-bismuth alloy.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 9A is a close-up image in plan view of solder balls formed by Sn/Ag nanocomposite solder paste after solder reflow.

FIG. 9B is a close-up image in perspective view of solder balls formed by Sn/Ag nanosolder paste after solder reflow.

DETAILED DESCRIPTION

Figure 1:
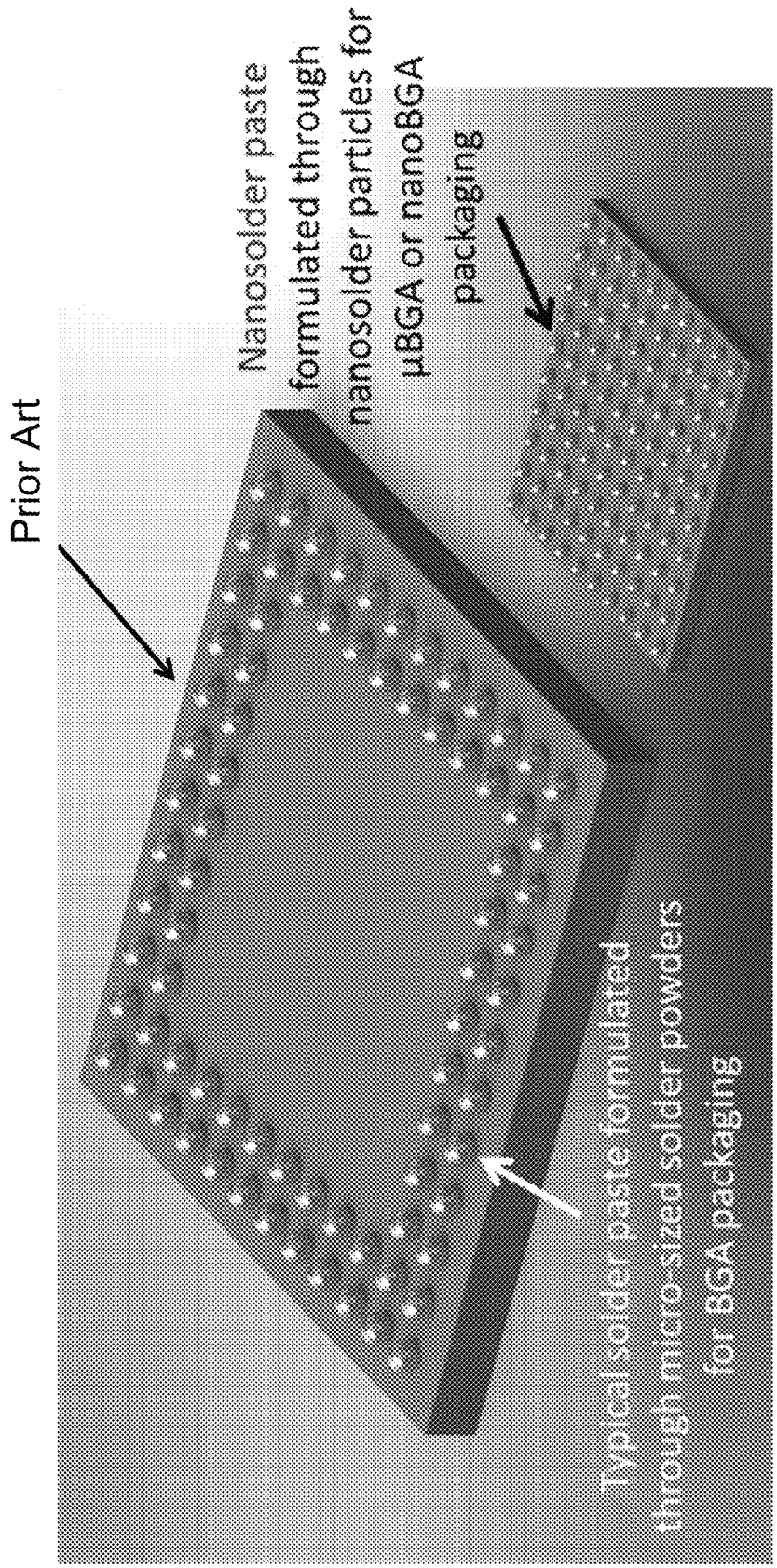
FIG. 1 is diagram that illustrates applications of nanosolder paste in electronics miniaturization. The prior art ball grid array (BGA) packaging typically uses larger solder bumps. The invention is expected to provide microBGA (μBGA) or nanoBGA solder bumps by using nanosolder paste.

In one aspect, this invention involves in the preparation and use of a lead-free nanosolder paste. FIG. 1 is diagram that illustrates applications of nanosolder paste in electronics miniaturization. The prior art ball grid array (BGA) packaging typically uses larger solder bumps. The invention is expected to provide microBGA (μBGA) or nanoBGA solder bumps by using nanosolder paste.

Figures 2A, 2B:
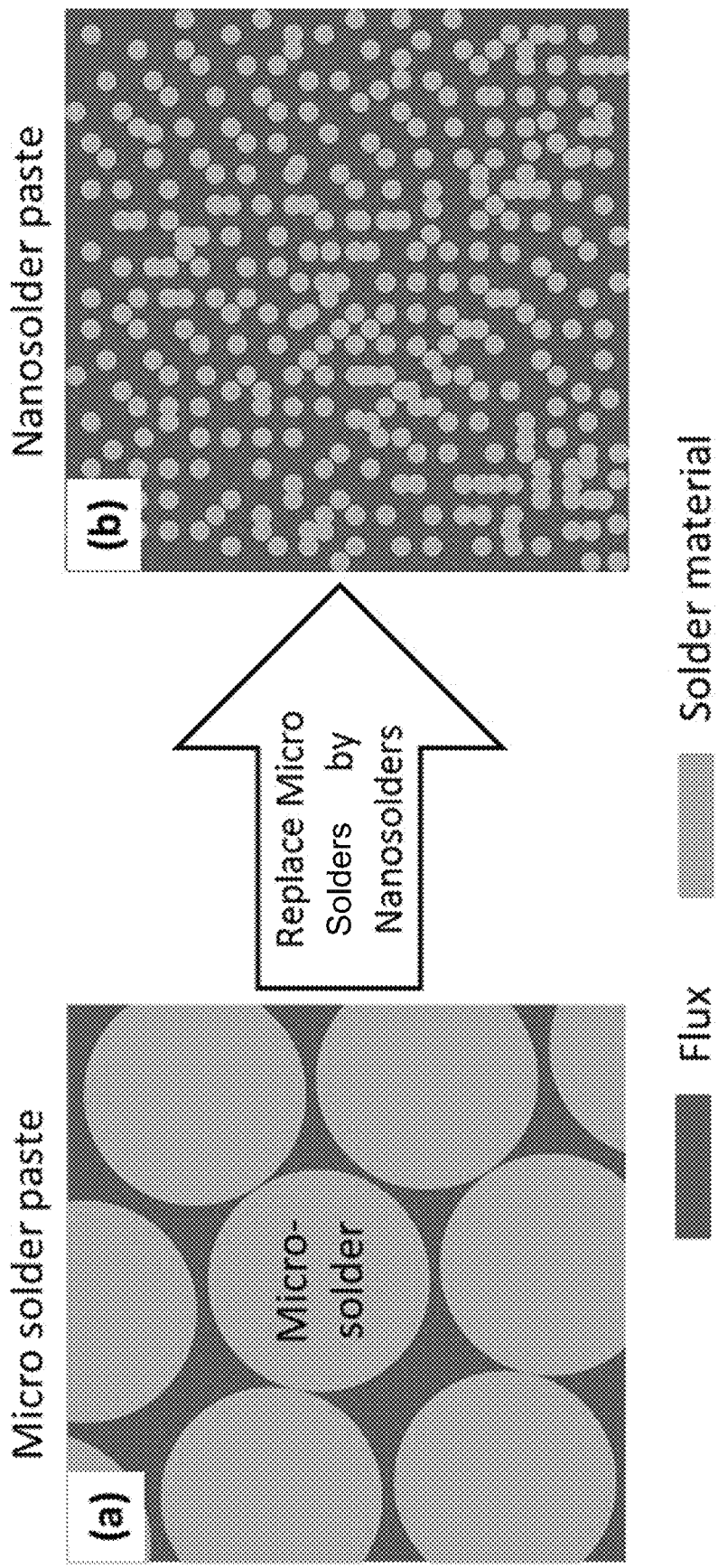
FIG. 2A is a diagram showing the microstructure of typical solder paste.
FIG. 2B is a diagram showing the microstructure of nanosolder paste.

In some embodiments, nanosolder particles replace the microsolder particle composed formulation, as shown in FIG. 2A. The invention enables printing and dispensing of solder material in stencil with smaller feature sizes, some mask, or nanoimprint lithographic processes, in order to apply on microelectronics/nanoelectronics manufacturing processes, for example, microelectronics packaging, MEMS (Microelectromechanical systems) or NEMS, or nanophotonic devices. Currently used prior art solder pastes are composed of micron sized solder balls with the size ranging between 20-45 μm, and are only able to be printed using stencils with a feature size several times larger than solder powders (this feature size normally ranges between 100 μm to several millimeters). The nanosolder paste that is the subject of the present disclosure contains nanosolder powders with sizes ranging between less than 10 nm to 100 nm, which can be printed in stencils or other masks with micron to submicron scale features (e.g., from 0.1 μm to 100 μm).

FIG. 2A is a diagram showing the microstructure of typical solder paste.

FIG. 2B is a diagram showing the microstructure of nanosolder paste.

Figures 3A, 3B:
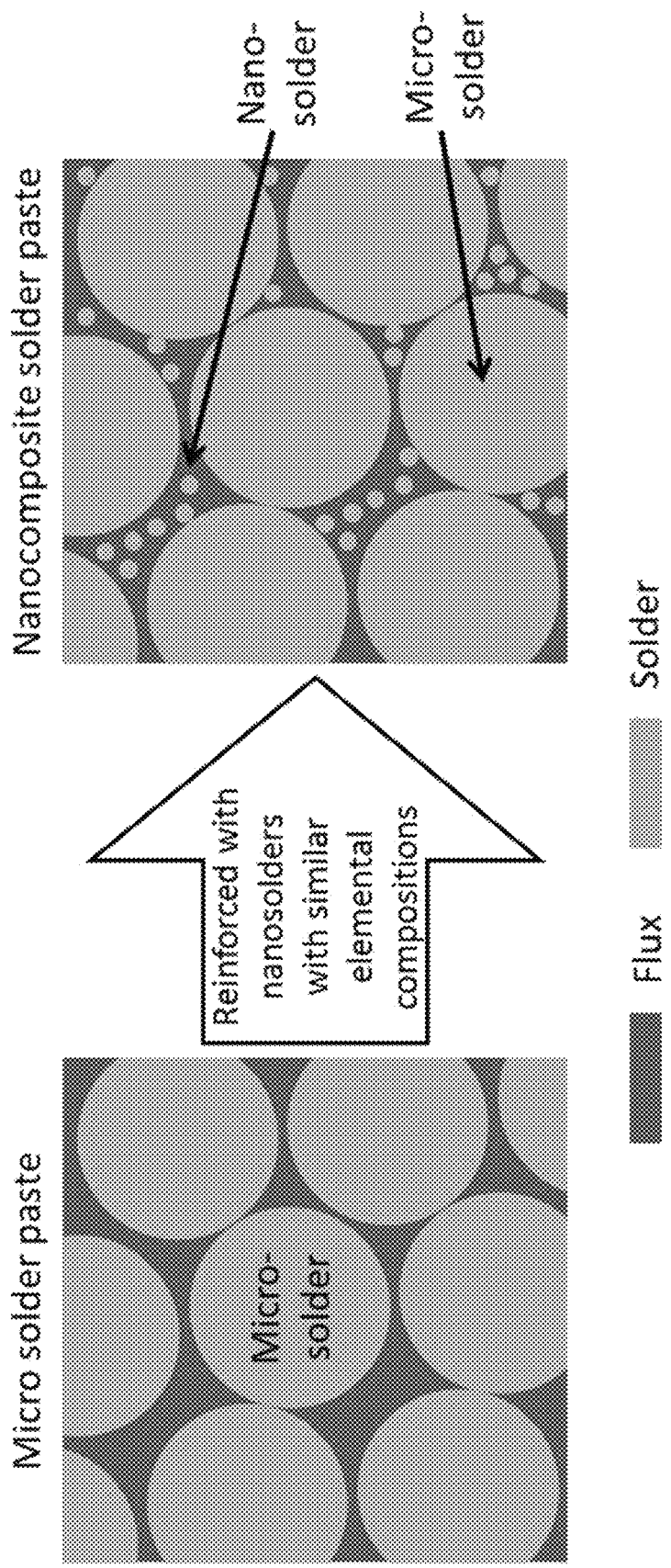
FIG. 3A is a diagram showing the microstructure of typical solder paste.
FIG. 3B is a diagram showing the microstructure of nanocomposite solder paste formulated after reinforcing the same or similar elemental composition nanosolders in micro-sized solder paste, according to principles of the invention.

In another aspect, the invention provides a lead-free solder paste reinforced with nanoscale solder particles of the same or similar element and composition as the micron-sized solder balls to form a homogeneous nanocomposite solder paste, as shown in FIG. 3A and FIG. 3B.

FIG. 3A is a diagram showing the microstructure of typical solder paste.

FIG. 3B is a diagram showing the microstructure of nanocomposite solder paste formulated after reinforcing the same or similar elemental composition nanosolders in micro-sized solder paste, according to principles of the invention.

Traditional solder pastes (FIG. 3A) include micron-sized solder powders that are imbedded in a paste flux material to enable printing and dispensing of solder material in microelectronics manufacturing processes. Prior research on composite solder paste used nanoparticles or nanotubes; however, the element and compositions of the nano-fillers used (such as Ni, Co, Ag, Cu, $TiO_2$, or carbon materials) are very different than the solder materials (mostly tin-based alloys). In our case, we use nanoparticles and microparticles made from the same solder composition. In one embodiment, Sn/Ag nanoparticles as fillers to mix with Sn/Ag micron solder balls to prepare a nanocomposite Sn/Ag solder paste. Similarly, we can use Sn/Ag/Cu (SAC) nanoparticles as fillers to mix with Sn/Ag/Cu micron solder balls to prepare a nanocomposite Sn/Ag/Cu solder paste. The reinforced nanocomposite solder paste that we describe here can enhance the mechanical strength of solder joints, and can reduce the bonding temperature for solder reflow processes due to the smaller melting temperature of nanoparticles compared to the bulk metal materials. Another method to lower the bonding temperature of lead-free solders is to mix/blend low melting temperature solders such as tin/indium (Sn/In) or tin/bismuth (Sn/Bi) nanopartilces into lead-free solder powders (such as Sn/Ag or Sn/Ag/Cu solder balls).

Figure 4:
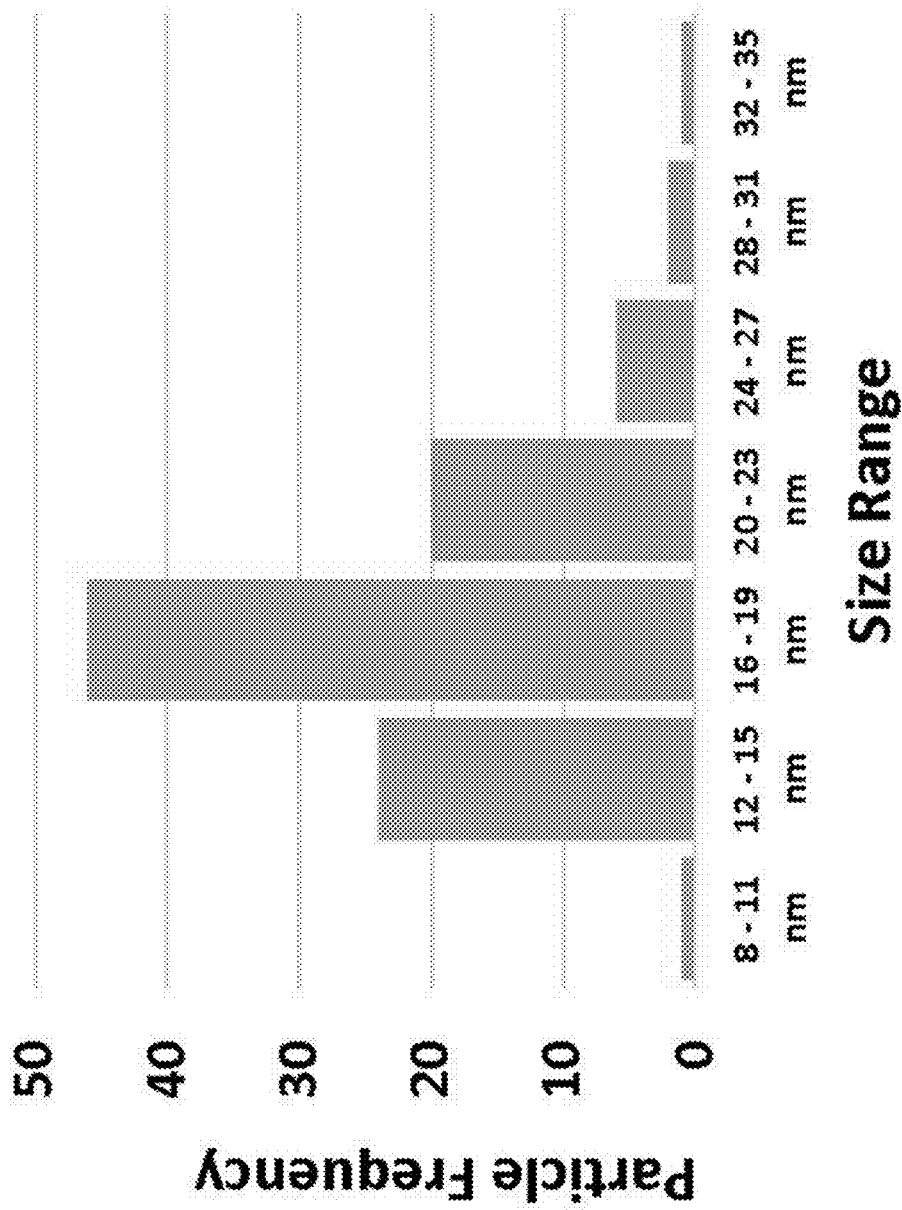
FIG. 4 is a graph showing the size distribution of Sn/Ag nanosolder particles.

FIG. 4 is a graph showing the size distribution of Sn/Ag nanosolder particles.

Synthesis and Use

Figure 5:
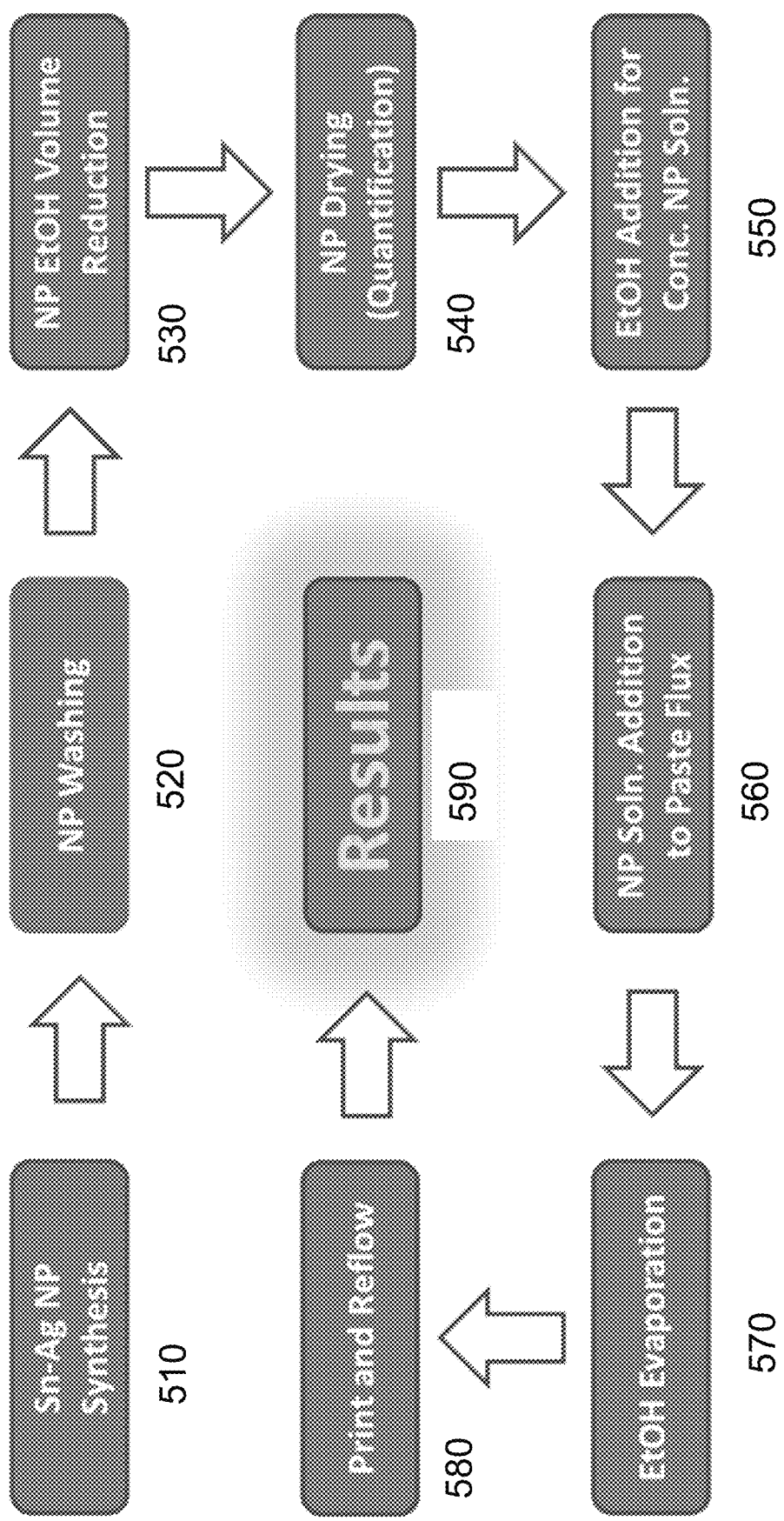
FIG. 5 is a process flow diagram showing the steps in preparing a solder composition, and performing a soldering operation, according to principles of the invention.

FIG. 5 is a process flow diagram showing the steps in preparing a solder composition, and performing a soldering operation, according to principles of the invention. In FIG. 5, the nanoparticles (for example Sn—Ag nanoparticles) are synthesized at step C010. At step C020 the nanoparticles are washed, as may be required to remove unnecessary material such as reagents. At step C030 the volume of the nanoparticle suspension may be reduced by removing ethanol (EtOH) or another suitable solvent. At step C040 the nanoparticles are dried, for example to allow quantification. At step C050 EtoH (or another suitable solvent) may be added to provide a concentrated solution of nanoparticles. At step C060 the nanoparticle solution is added to a paste flux. At step C070 the EtOH solvent (or other suitable solvent) is removed, for example by evaporation. At step C080 the solder paste is printed and can be reflowed to join two or more components. At step C090 the results are examined and it is determined whether the solder operation is successful or not.

The components and apparatus used in the Sn—Ag embodiments included: tin sulfate and silver nitrate as precursor metal salts; sodium borohydride as reducing agent, de-ionized water and ethanol as solvents, 2M Hydrochloric Acid solution, Qualitek DPF 800UV Halogen-Free Paste flux, and sodium dodecyl sulfate as a surfactant. A Torch T200N Nitrogen lead-free reflow oven was used for heating.

In some embodiments, Sn/Ag nanoparticles acting as nanosolders were synthesized using a surfactant assisted chemical reduction method in an aqueous environment. Sodium dodecyl sulfate is first dissolved in 200 mL of de-ionized water in a 500 mL round bottom flask while being stirred at a rate of 125 rpm. Hydrochloric acid is then added to adjust the pH of the solution to a value of 2 to prevent hydrolysis of $Sn^{2+}$ ions when added to the aqueous environment. Tin sulfate and silver nitrate were then added to the solution where the solution turned cloudy white. The relative amount of each salt added varied based upon the desired composition of the nanosolder material. A sodium borohydride solution is then added drop wise where the color turns to a dark brown color indicating the reduction of the metal ions. Once the reaction has proceeded for 30 minutes, the nanoparticle solution is centrifuged at 10,000 rpm in 8 minute cycles. A total of 5 water and 5 ethanol washes were performed before the particles were dried in a vacuum oven for mass determinations.

In some embodiments, the as synthesized nanoparticle (see FIG. 20) are mixed with commercial flux to form nanosolder paste by following several steps.

Known quantities of the nanoparticles to be added are dispersed in a small volume of a volatile solvent, in this case ethanol.

This is followed by sonication for 2 minutes at maximum intensity in a 75 W ultrasonicator to disperse the particles.

The appropriate amount of paste flux is weighed and the particle solution is then added.

The ethanol from the particle solution is evaporated leaving the remaining nanoparticles dispersed in the paste flux medium.

Ultimately, the flux can be varied for different paste applications. The final formulated nanosolder paste shows darker color compared to the microsolder formed paste as shown in FIG. 6.

Figure 6:
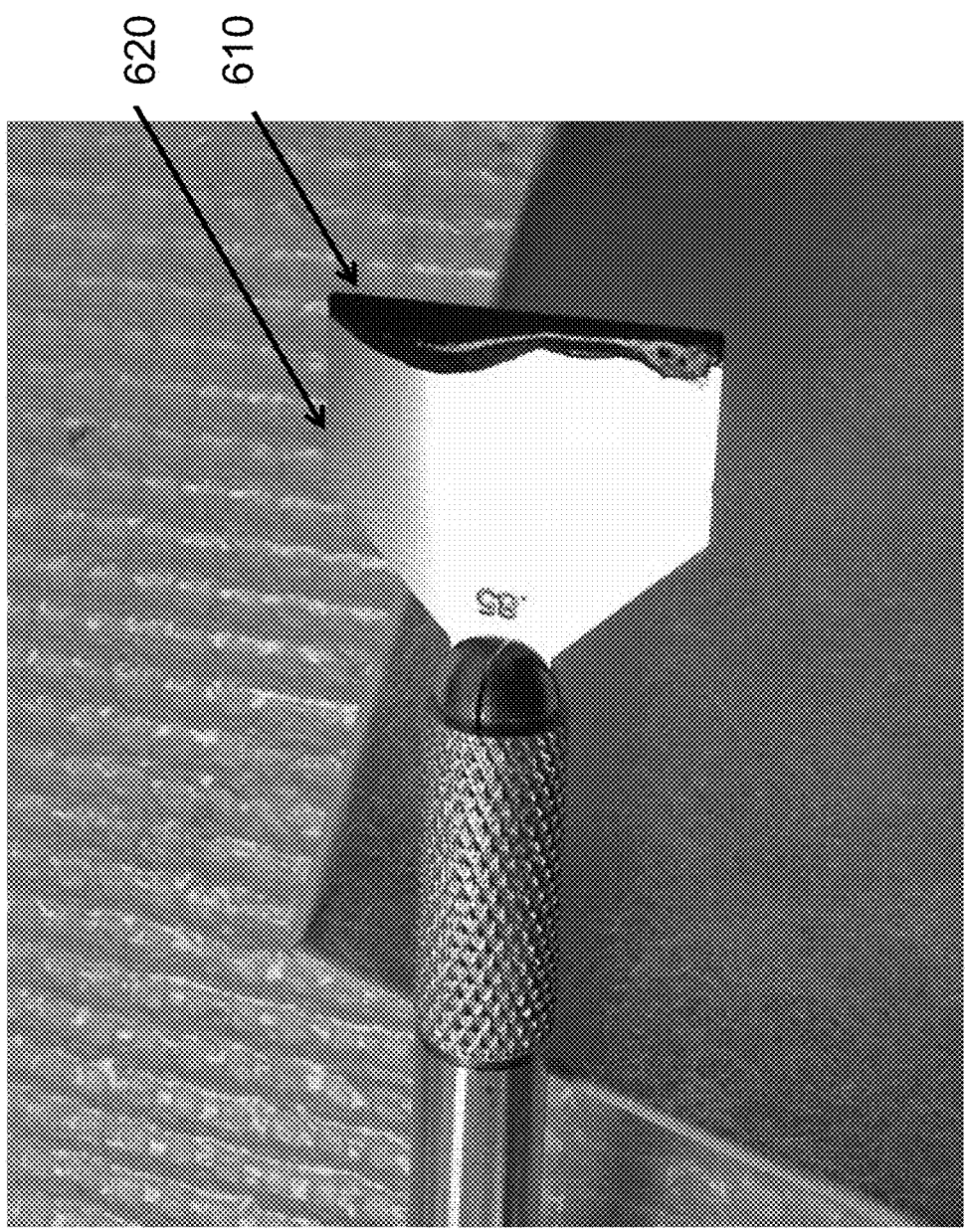
FIG. 6 is an image showing a nanosolder paste formulated with up to 80% metallic nanoparticle loading, on the end of a squeegee tool.

FIG. 6 is an image showing a nanosolder paste 610 formulated with up to 80% metallic nanoparticle loading, on the end of a squeegee tool 620.

Figure 18:
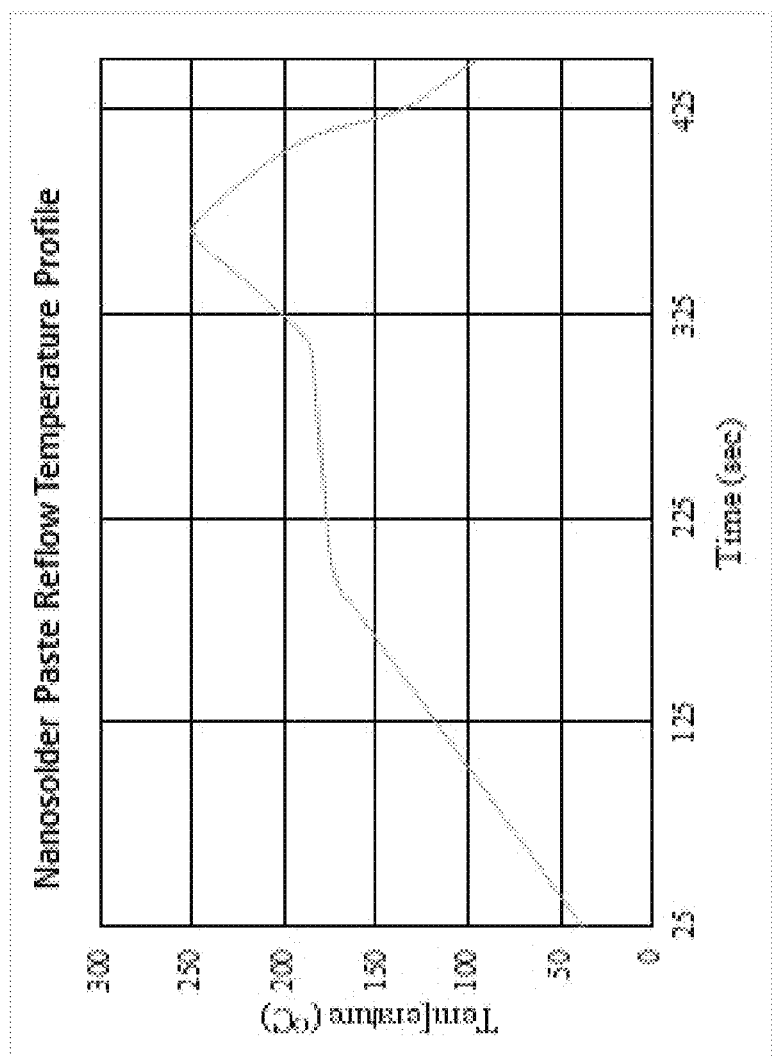
FIG. 18 is a graph of temperature vs. time for a Sn/Ag nanosolder paste reflow process.
Figures 28A, 28B, 28C:
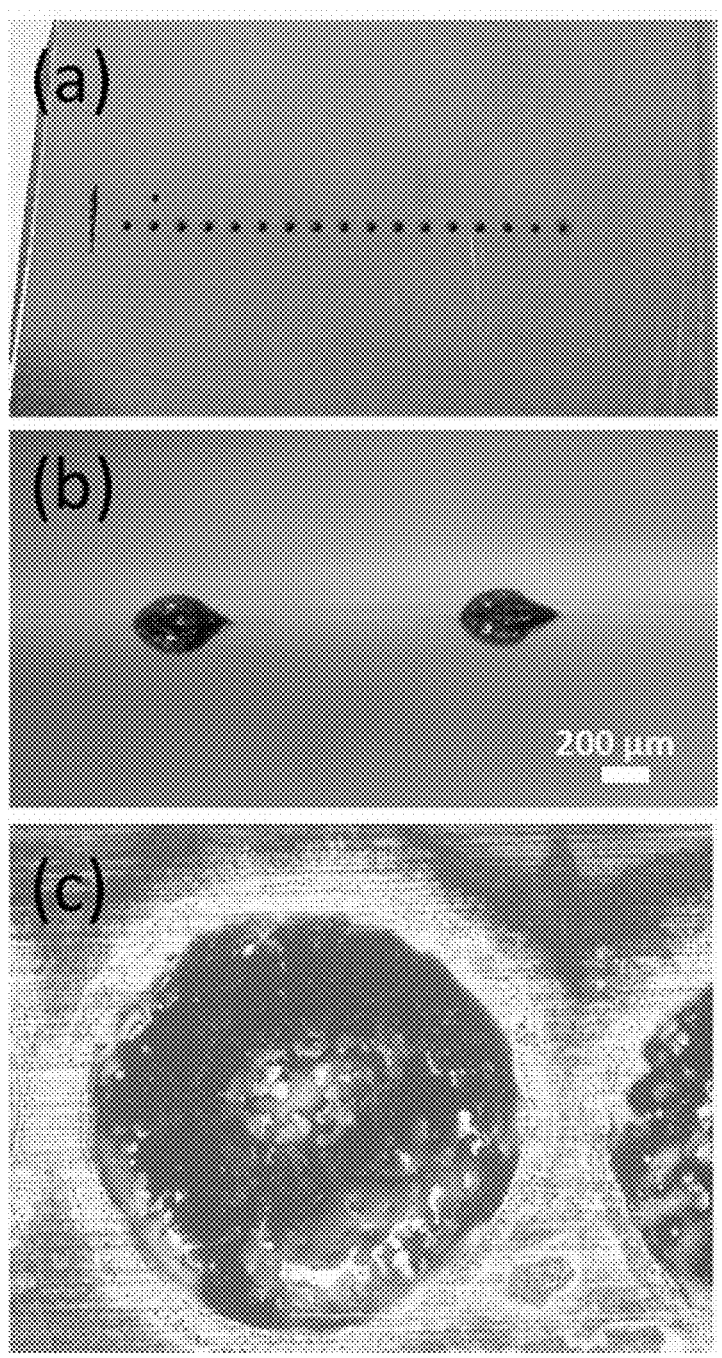
FIG. 28A is a perspective view of Sn/Ag nanosolder paste printed on the copper substrate through small featured stencil (14 mil/3 mil).
FIG. 28B is a close-up view of Sn/Ag nanosolder paste printed on the copper substrate through small featured stencil (14 mil/3 mil).
FIG. 28C is a close-up view of one Sn/Ag nanosolder bump formed after a reflow process.

The nanosolder paste has been proved to be printed on copper substrate through stencils, and reflowed by following a typical temperature profile, for example as shown in FIG. 18. The stencils with small features have been designed with the feature diameter of 14 mil (~350 μm) and stencil thickness of 3 mil, and the nanosolder paste is able to release from the stencil for reflow, as shown in FIG. 28A. The reflowed nanosolder paste formed a solder bump with the diameter of 14 mil. Theoretically, the feature size of stencils can be designed down to submicron scale for printing.

Figure 7:
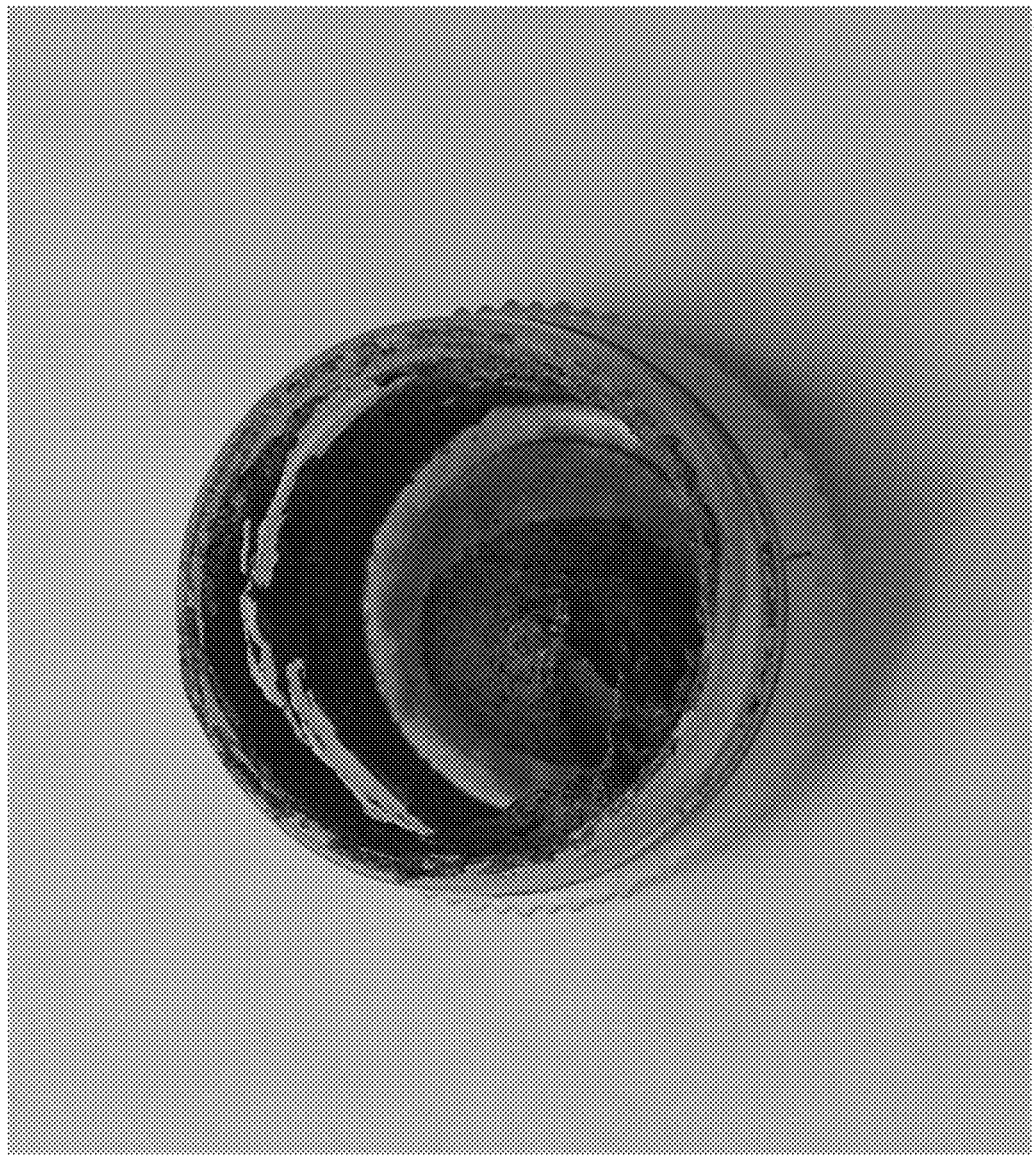
FIG. 7 is an image showing a homogeneous nanocomposite solder paste with metallic material (micron solder balls mixed with nanosolder particles) with a loading up to 80%.

FIG. 7 is an image showing a homogeneous nanocomposite solder paste with metallic material (micron solder balls mixed with nanosolder particles) with a loading up to 80%. 1%, 2% and 5% weight percent of as synthesized nanosolders (in step C010 of FIG. 5) were added in microsolder paste to form the nanocomposite solder paste (see FIG. 7).

In another embodiment, in preparing nanosolder pastes, a concentrated nanoparticle solution with a volatile solvent is first prepared. Using a known mass of nanosolder, 500 μL of ethanol is added and a 75 W bath ultrasonicator is used to disperse the particles from each other. The flux is then weighed in the final solder paste container. The amount of flux required depends on the desired flux to solder mass ratio. Using a micropipette, the concentrated nanosolder solution was added the paste flux and stirred. Based upon the density of the solvent and the known amounts of nanosolder material and past flux, the mass of solvent required to evaporate can be determined. Stirring of the solder paste continues until all of the excess ethanol that was added is evaporated. The resulting pastes are then used for printing and reflow.

To print the prepared pastes, in some embodiments a 1"×1" flip-up style stencil with 28 mil apertures and a 6 mil thickness is aligned on a Cu substrate. Once some paste is applied to the squeegee, the squeegee is placed against the stencil pattern face down and slowly moved over the entire pattern of the stencil. A second pass is made to make sure there is no excess solder material present. The stencil is then flipped up to reveal nanosolder paste where the pattern was.

Immediately after printing, the paste is then reflowed in a benchtop reflow oven using a reflow profile imitating that used in industry. In some embodiments, the oven is first purged with nitrogen at a flow rate of 5 L/min for 30 seconds and was then turned down to 1 L/min after the reflow process began. The total reflow time is approximately 4 minutes with a time above liquidus between 50-55 seconds. The max reflow temperature during the process is 248° C. The resulting reflow samples are then allowed to cool to room temperature for inspection.

Figure 8:
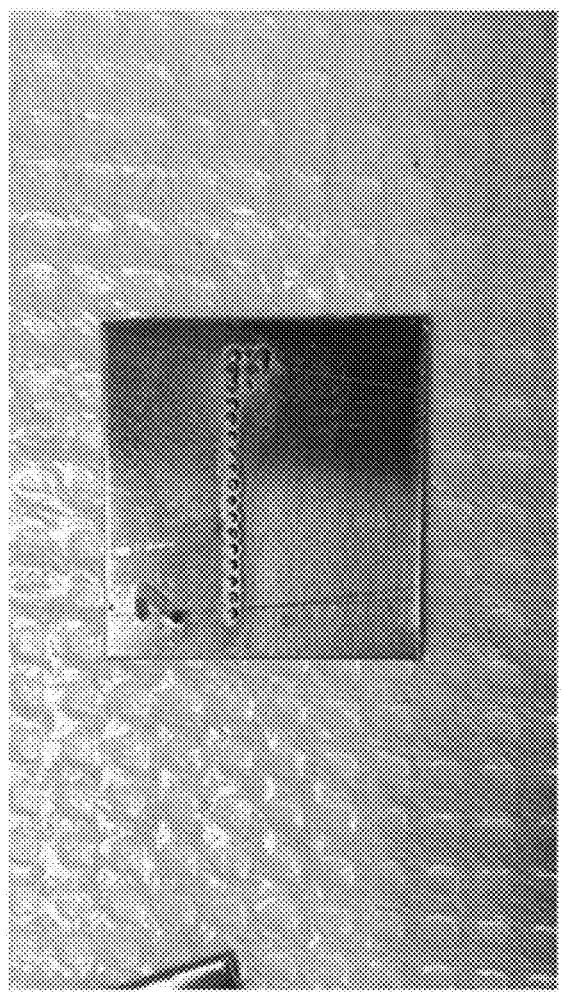
FIG. 8 is an optical image of a micro/nano-BGA formation of Sn/Ag nanosolder paste after solder reflow, according to principles of the invention.

FIG. 8 is an optical image of a micro/nano-BGA formation of Sn/Ag nanosolder paste after solder reflow, according to principles of the invention.

FIG. 9A is a close-up image in plan view of solder balls formed by Sn/Ag nanosolder paste after solder reflow.

FIG. 9B is a close-up image in perspective view of solder balls formed by Sn/Ag nanosolder paste after solder reflow.

Compositional Analysis

Figure 10:
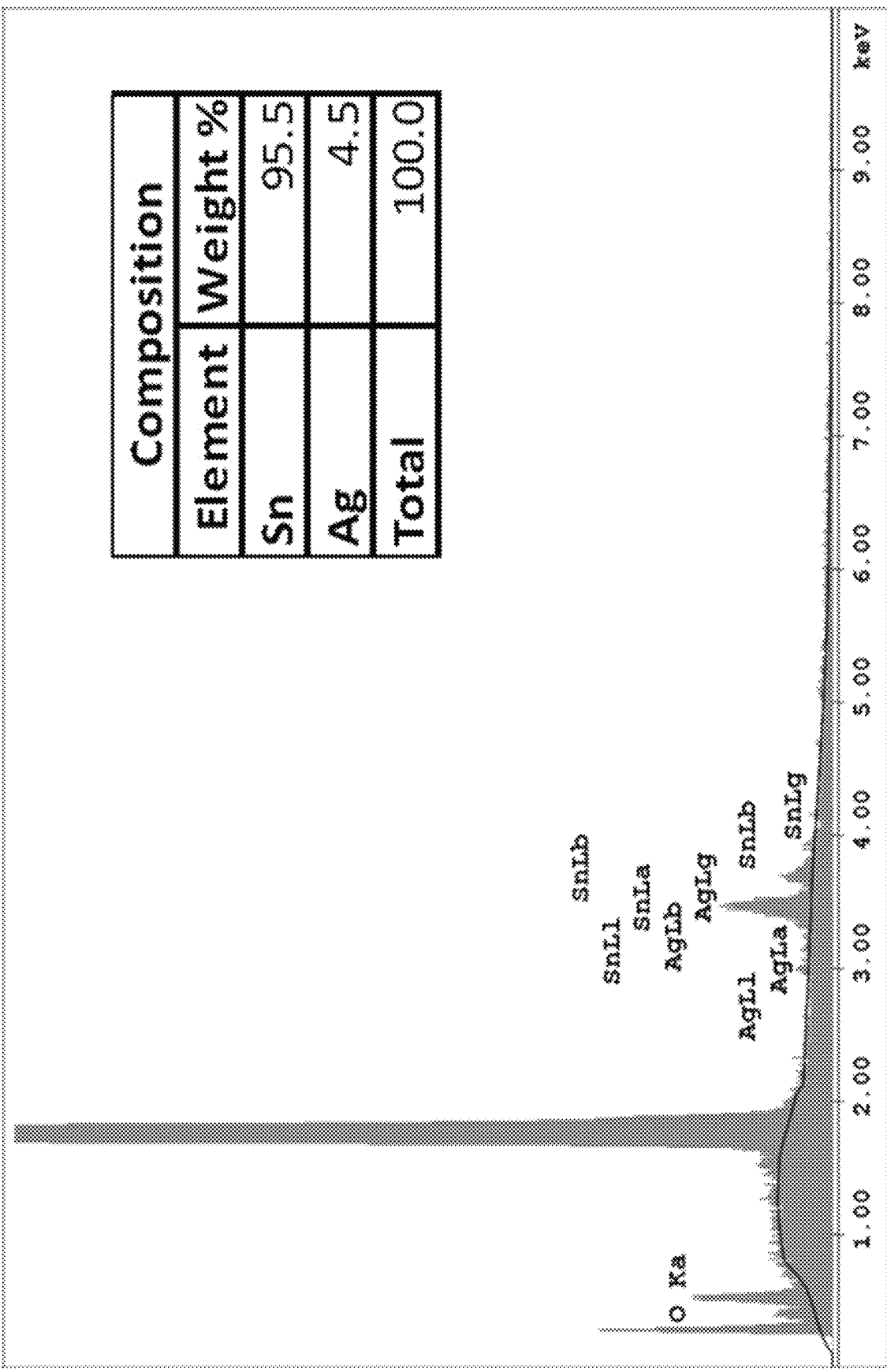
FIG. 10 is a graph illustrating an elemental analysis performed by x-ray methods of as synthesized Sn/Ag alloy nanosolder in which the weight ratio of Sn:Ag is 95.5:4.5.

FIG. 10 is a graph illustrating an elemental analysis performed by x-ray methods of as synthesized Sn/Ag alloy nanosolder in which the ratio of Sn:Ag is 95.5:4.5.

Figure 11:
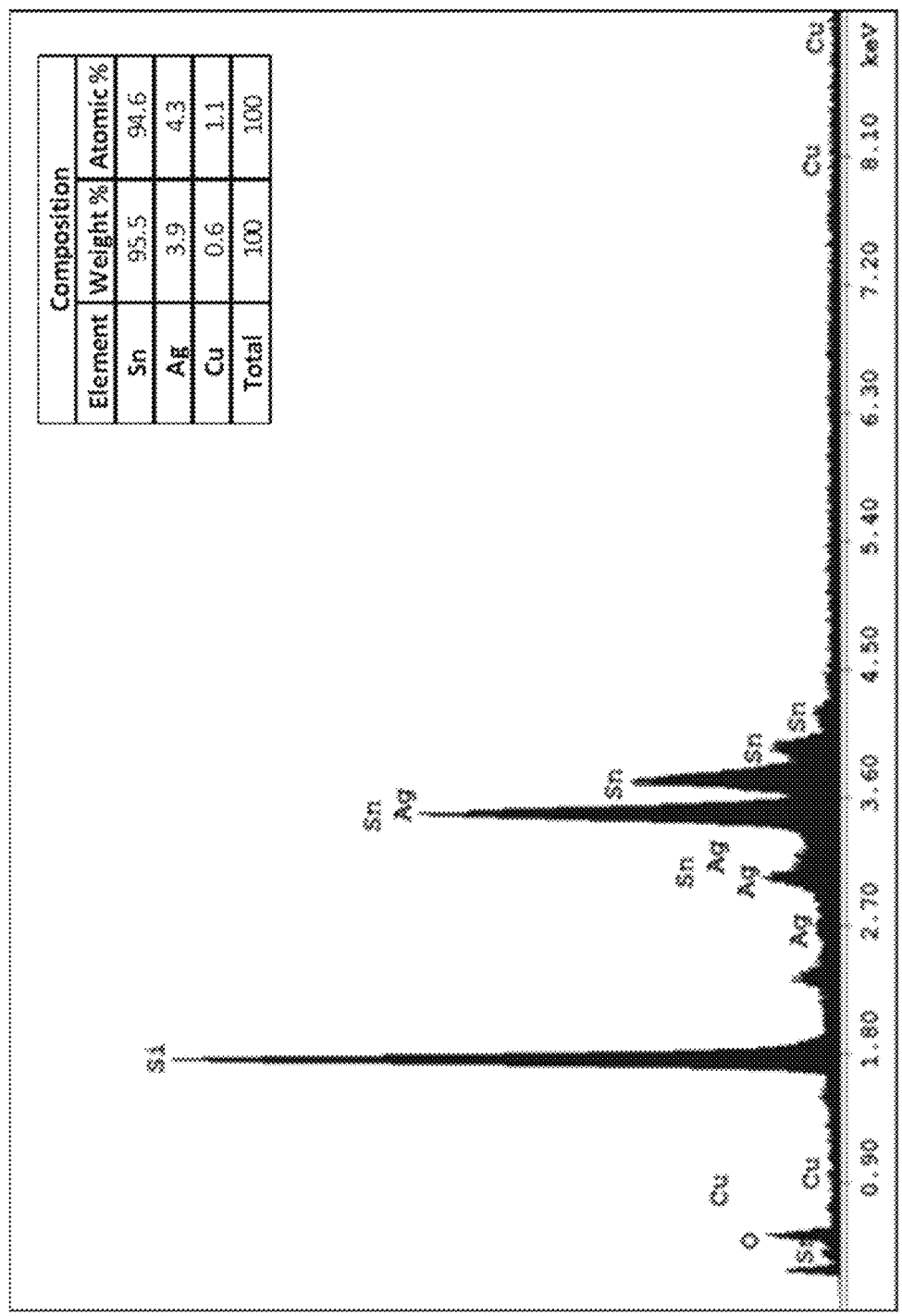
FIG. 11 is a graph illustrating an elemental analysis performed by x-ray methods of as synthesized SAC nanosolder in which the ratio of Sn:Ag:Cu is close to 95.5:4:0.5 (which can also be written as SAC405). Another composition that is used is SAC305 which indicates that the ratio of Sn:Ag:Cu is 96.5:3:0.5.

FIG. 11 is a graph illustrating an elemental analysis performed by x-ray methods of as synthesized SAC nanosolder in which the ratio of Sn:Ag:Cu is close to 95.5:4:0.5 (which can also be written as SAC405). Another composition that is used is SAC305 which indicates that the ratio of Sn:Ag:Cu is 96.5:3:0.5.

Figure 12:
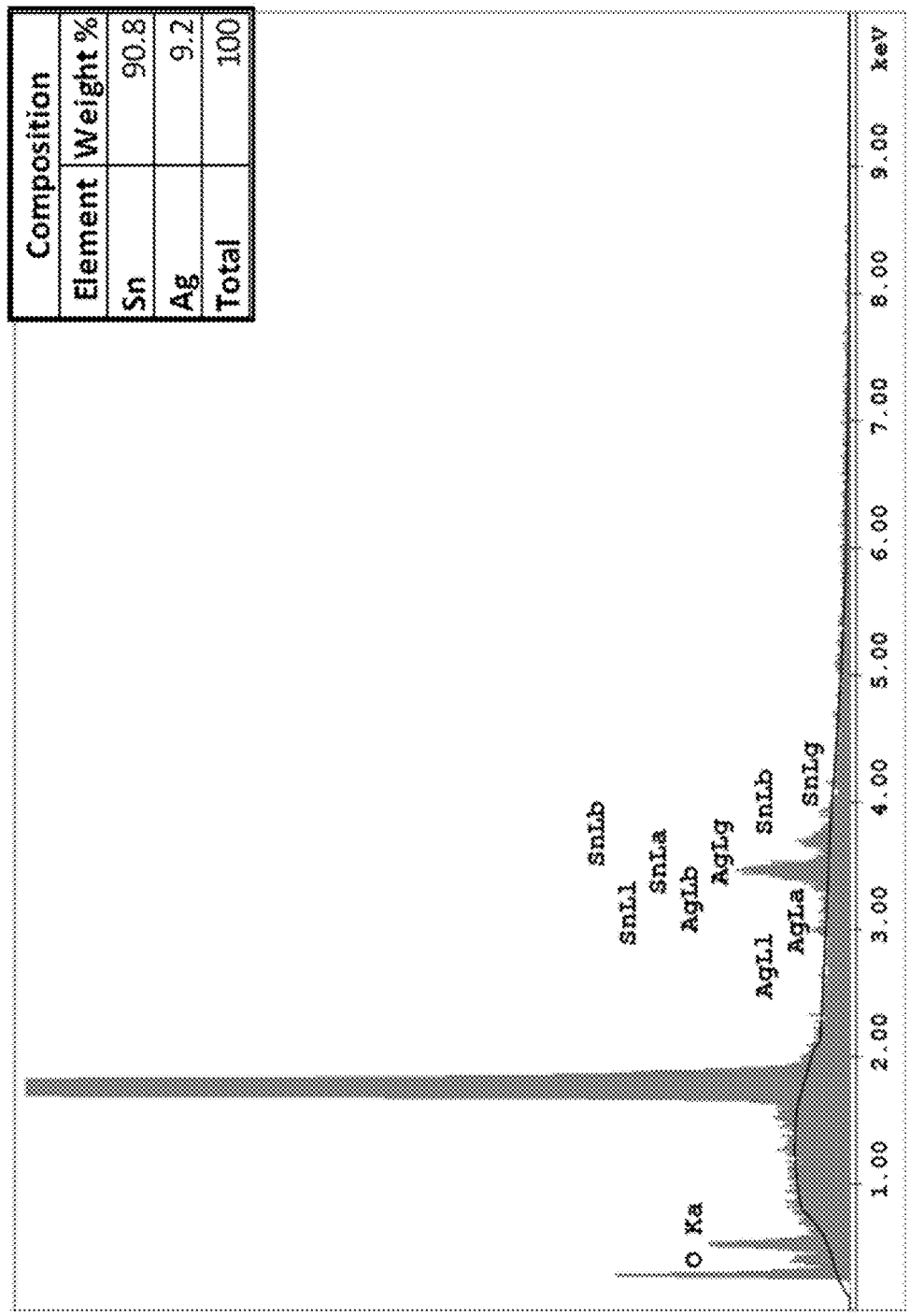
FIG. 12 is a graph illustrating an elemental analysis performed by x-ray methods of Sn/Ag nanosolder particles which indicates that the ratio of Sn:Ag is 90.8:9.2.

FIG. 12 is a graph illustrating an elemental analysis performed by x-ray methods of Sn/Ag nanosolder particles which indicates that the ratio of Sn:Ag is 90.8:9.2.

Thermal Properties of Nanosolder Pastes Obtained by DSC Data

Differential Scanning calorimetry (DSC) was used to analyze the melting temperature of various compositions of nanoparticles. DSC was carried out on all samples in a nitrogen environment at a heat ramp of 10° C. per minute.

Figure 13:
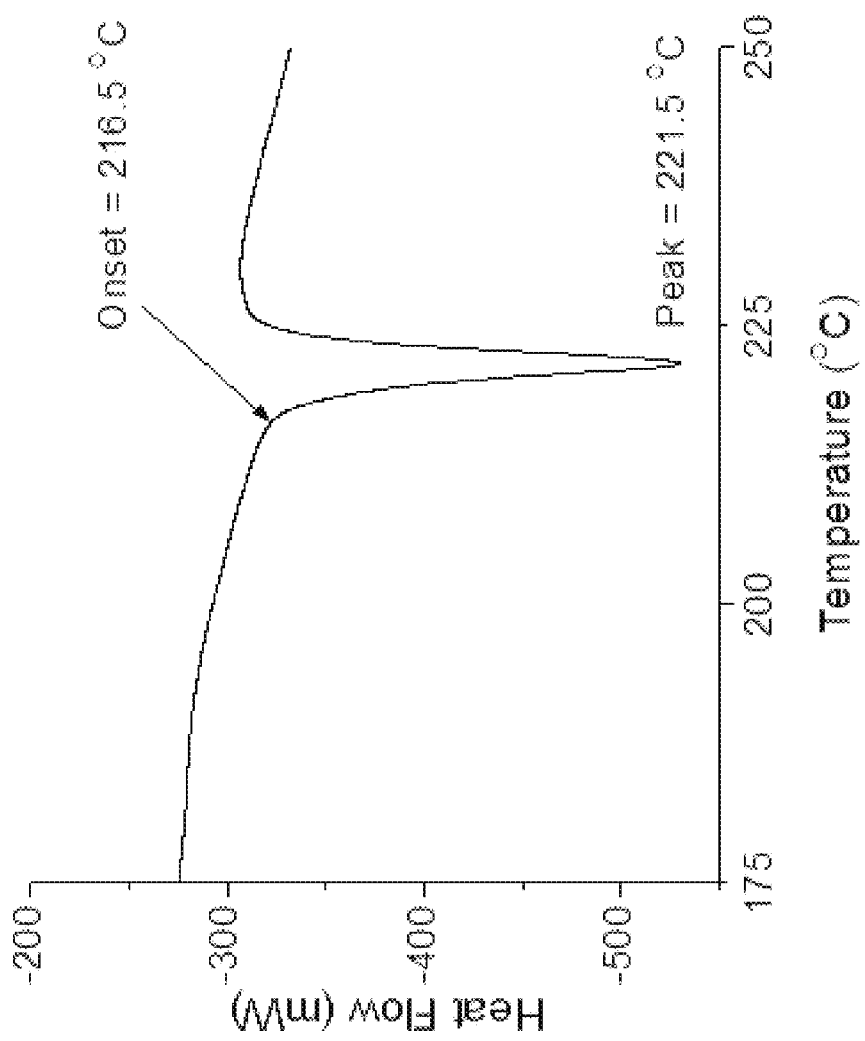
FIG. 13 is a graph showing differential scanning calorimeter (DSC) data that indicates that the SAC nanosolders start melting at 216.5° C., which can be used as a reference temperature to set up the reflow temperature profile.

FIG. 13 is a graph showing differential scanning calorimeter (DSC) data that indicates that the SAC nanosolders start melting at 216.5° C., which can be used as a reference temperature to set up the reflow temperature profile.

Figure 14:
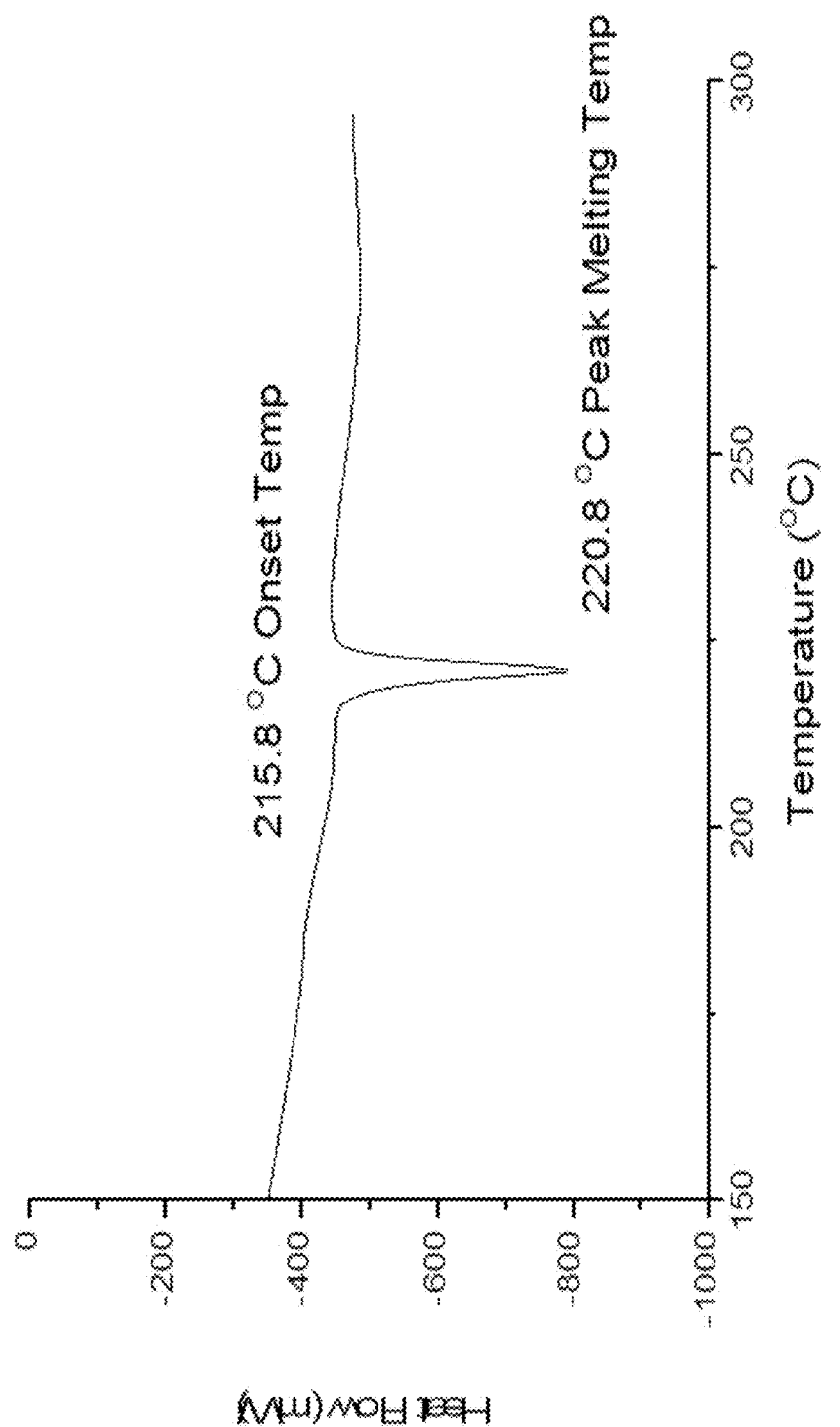
FIG. 14 is a graph showing DSC data for dry Sn—Ag nanosolder particles that start melting at 215.8° C.

FIG. 14 is a graph showing DSC data for of dry Sn—Ag nanosolder particles that start melting at 215.8° C.

Figure 15:
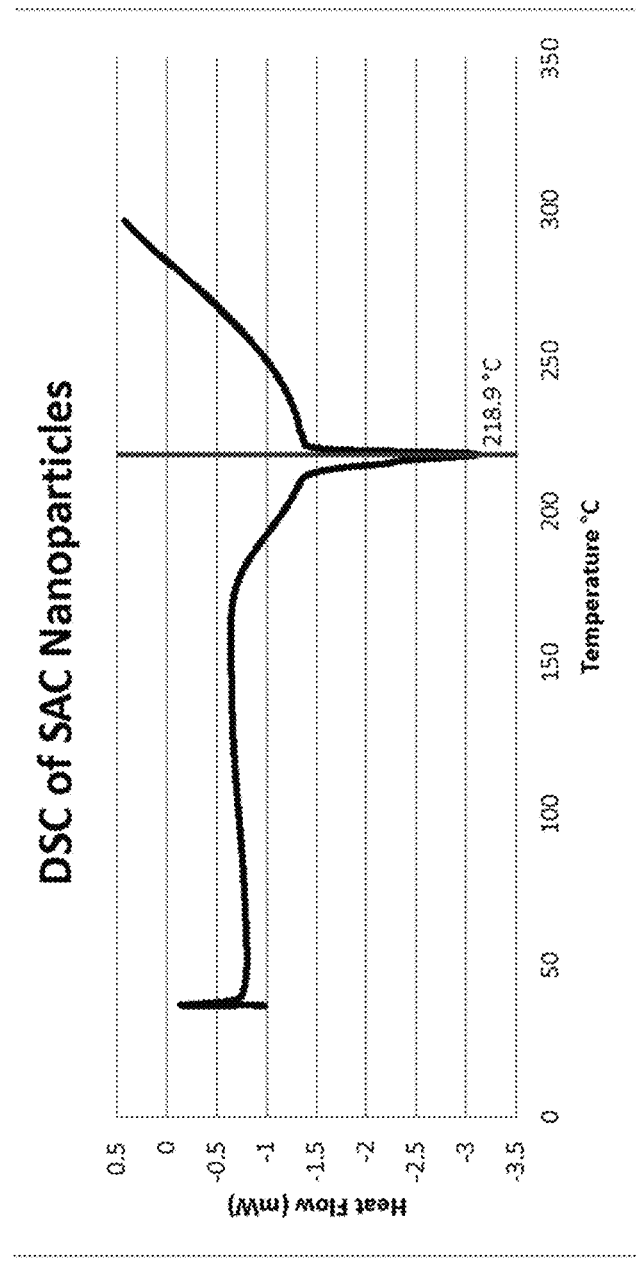
FIG. 15 is a graph showing DSC data for SAC nanoparticles synthesized by surfactant assisted chemical reduction.

FIG. 15 is a graph showing DSC data for SAC nanoparticles synthesized by surfactant assisted chemical reduction. FIG. 15 shows the DSC result of prepared nanoparticles, depicting an endothermic peak at 218.9° C. that denotes the phase change of the solid nanoparticles into liquid. The prepared nanoparticles showed an average alloy composition close to SAC 405 and a mean size of 21.4 nm exhibits a possible depression in melting temperature. The prepared nanoparticles exhibited a melting temperature within the common range of SAC 405 bulk solders, between 217° C.

and 219° C. In contrast, the prepared nanoparticles fall within a size range that has exhibited melting temperature depressions of up to a 17° C.

Figure 16:
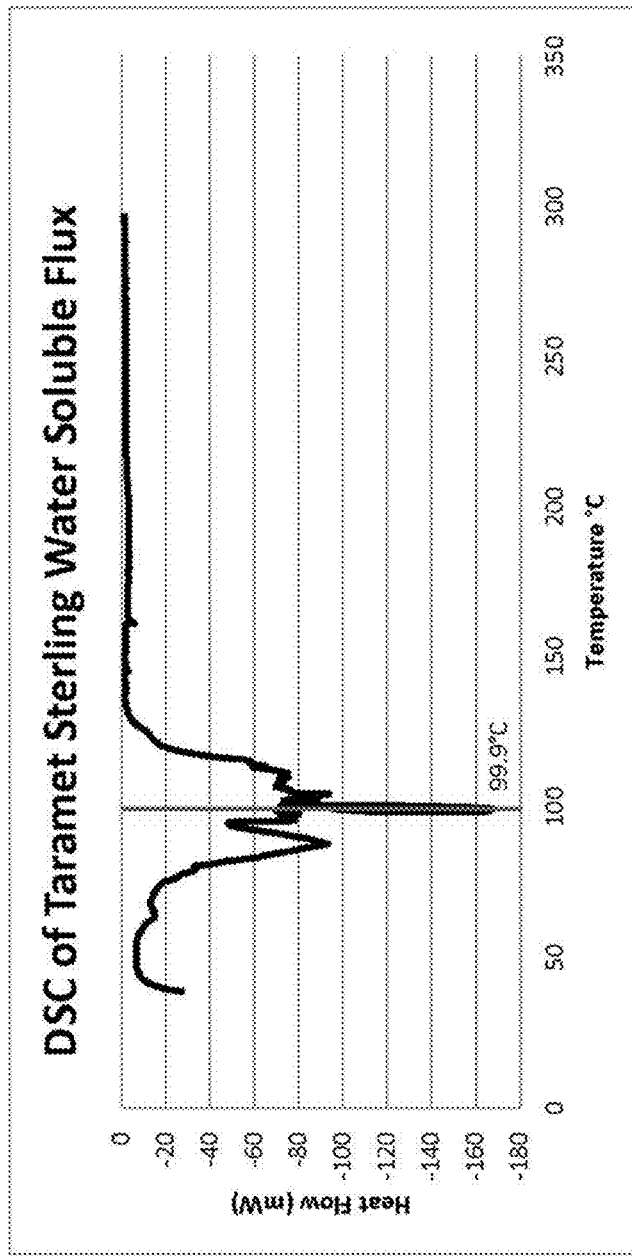
FIG. 16 is a graph showing DSC data for Taramet Sterling® Flux.

FIG. 16 is a graph showing DSC data for Taramet Sterling® Flux.

Prior to mixing with prepared SAC nanoparticles and commercial SAC microparticles, the Taramet Sterling® Flux was characterized to ascertain its thermal attributes. The flux's point of highest heat absorption lies at 99.9, very near the boiling point of water, as shown in FIG. 16. This water-based solder flux was expected to exhibit such a peak. A scattering of nearby peaks is the result of heat-absorption by the many other ingredients within the flux as they undergo similar changes in phase.

Figure 17:
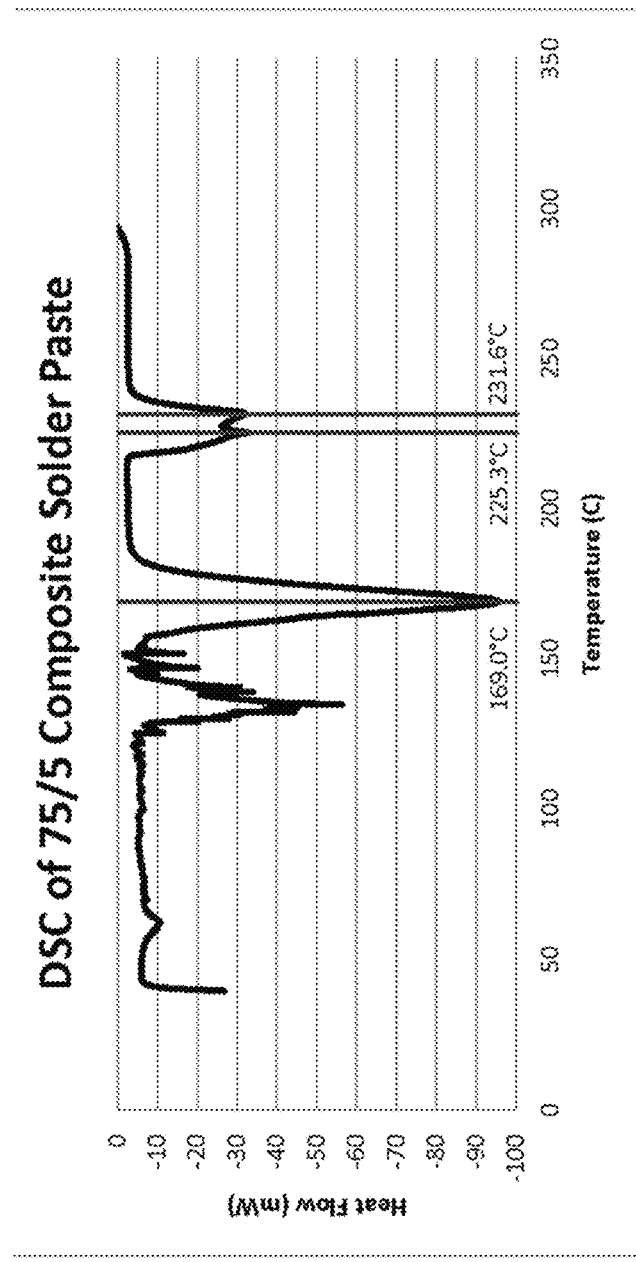
FIG. 17 is a graph showing DSC data for composite paste comprised of Taramet Sterling® Flux, AmTECH SAC microsolder powders, and synthesized SAC nanoparticles.

FIG. 17 is a graph showing DSC data for composite paste comprised of Taramet Sterling® Flux, AmTECH SAC microsolder powders, and synthesized SAC nanoparticles. FIG. 17 shows the DSC result of 75/5 composite SAC solder paste. There was no endothermic peak near 100° C. where the water residing in the flux would have changed phase to vapor. This may be due in part to the time interval in which DSC samples were prepared and transported for analysis. RH in the laboratory environment was not measured on the days of preparation to verify this cause. The first series of peaks occurs in jagged formation below 150° C. in a series of rises and falls, followed immediately by an onset melting point that leads to the largest endothermic peak at 169° C. Further DSC analysis is required to ascertain the cause of these visible spikes in heat absorption at incongruous temperature. The remaining two peaks are observed in close succession, the first at 225.3° C. and the second at 231° C. The first peak resides near the melting temperature range of SAC 305 microsolders, and the second peak resides beyond this range. These results may be due to oxides that may have formed while prepared nanoparticles sat stored in their solutions before and during washings. Oxides may have also formed during the preparation and transfer of DSC samples, due to the evaporation of water within the flux. If the flux's protective characteristics were so compromised, the nanoparticles might be susceptible to oxidation.

Reflow Temperature Profiles

FIG. 18 is a graph of temperature vs. time for a Sn/Ag nanosolder paste reflow process.

Figure 19:
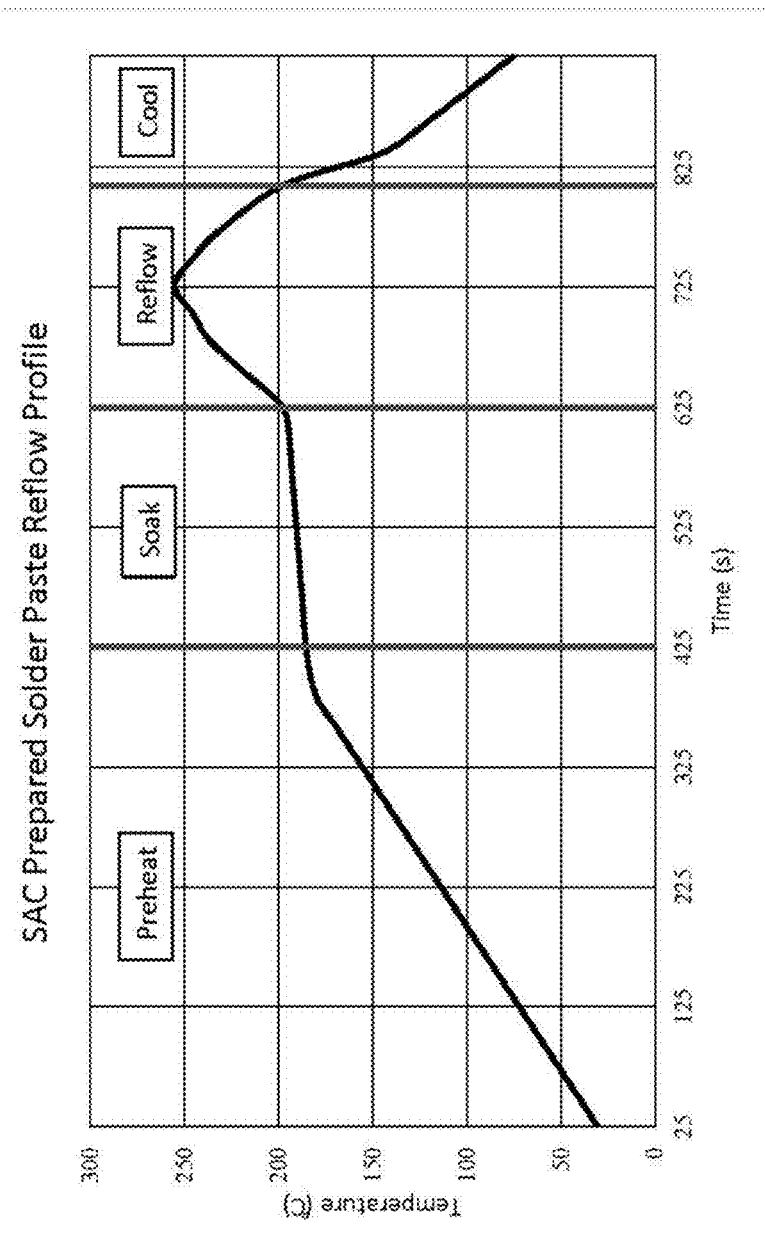
FIG. 19 is a graph of temperature vs. time for a tin-silver-copper (SAC) nanosolder reflow process. The peak temperature would be equal or less than 250° C. to ensure complete melting of nanosolders.

FIG. 19 is a graph of temperature vs. time for a tin-silver-copper (SAC) nanosolder reflow process. The peak temperature would be equal or less than 250° C. to ensure complete melting of nanosolders. DSC results informed the derivation of a final temperature profile used to reflow prepared solder pastes. The heating systems were programmed to create the temperature profile shown in FIG. 19.

Particles

Figures 20A, 20B:
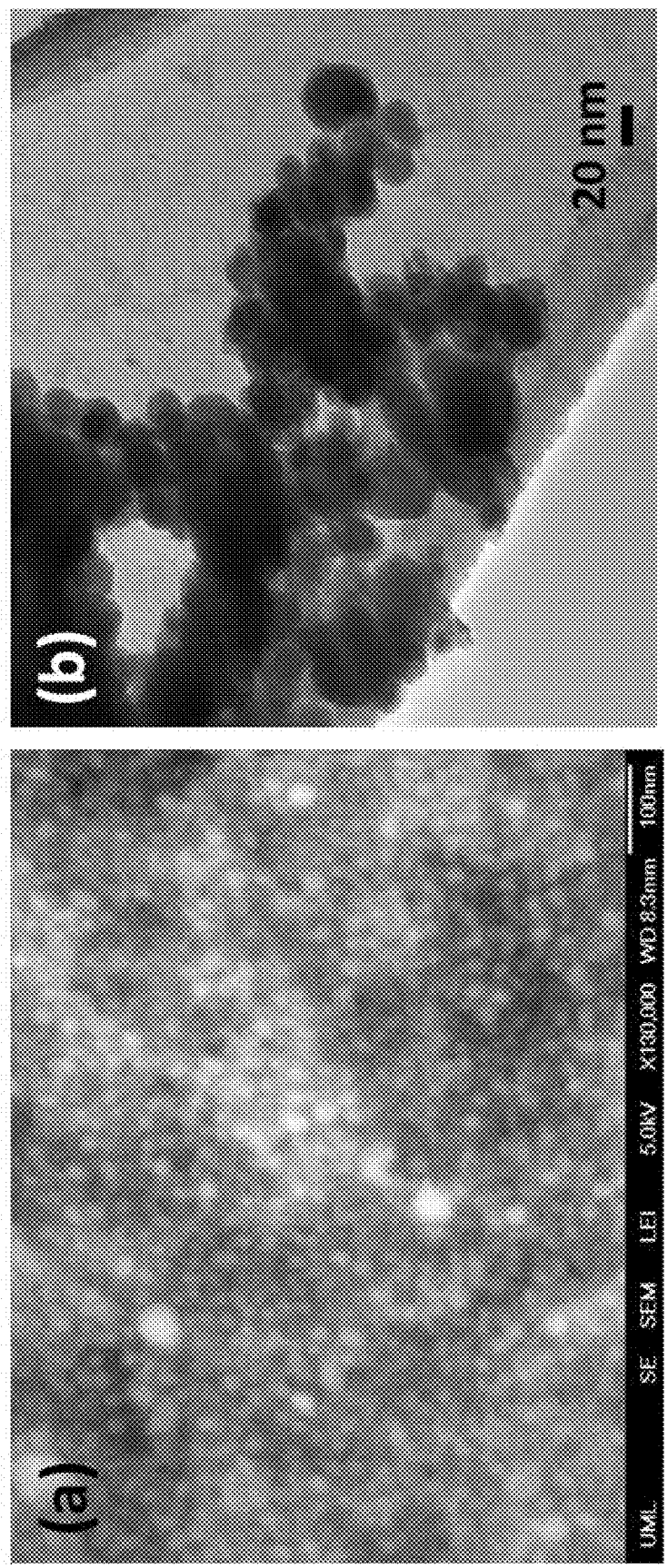
FIG. 20A is an SEM image of Sn/Ag nanosolders which were used to formulate the nanosolder paste. The images show that the size of nanosolders ranges from 15-40 nm in diameter.
FIG. 20B is a TEM image of Sn/Ag nanosolders which were used to formulate the nanosolder paste. The images show that the size of nanosolders ranges from 15-40 nm in diameter.

FIG. 20A is an SEM image of Sn/Ag nanosolders which were used to formulate the nanosolder paste. The images show that the size of nanosolders ranges from 15-40 nm in diameter.

FIG. 20B is a TEM image of Sn/Ag nanosolders which were used to formulate the nanosolder paste. The images show that the size of nanosolders ranges from 15-40 nm in diameter.

Figures 21A, 21B:
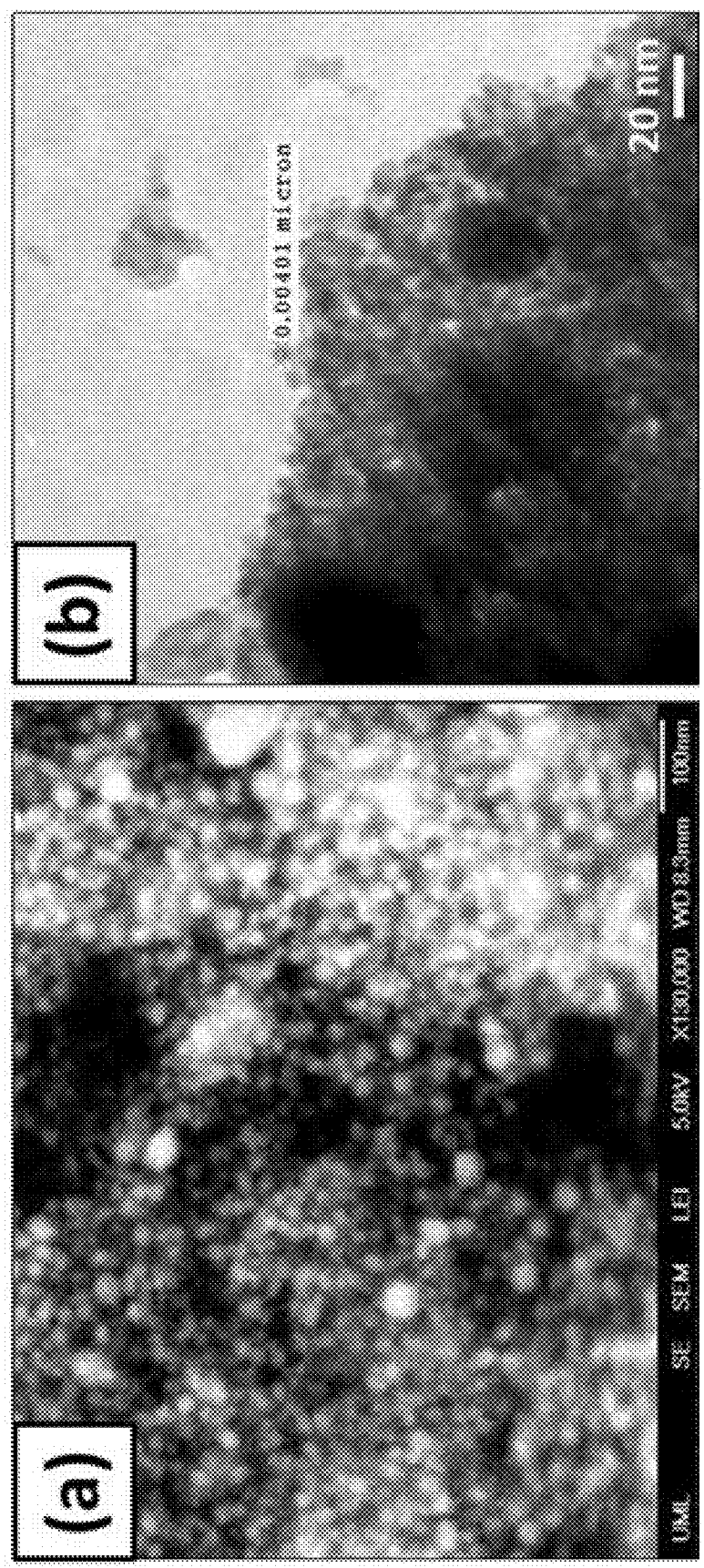
FIG. 21A is an SEM image of SAC nanoparticles showing a dispersion of particle sizes under 50 nm.
FIG. 21B is a TEM image of SAC nanoparticles showing particles smaller than 5 nm and particles in the 10-30 nm size range.

FIG. 21A is an SEM image of SAC nanoparticles showing a dispersion of particle sizes under 50 nm;

FIG. 21B is a TEM image of SAC nanoparticles showing particles smaller than 5 nm and particles in the 10-30 nm size range; This invention imbeds nanopowders in the same system to improve joint quality upon reflow as shown in FIG. 21.

Figure 22:
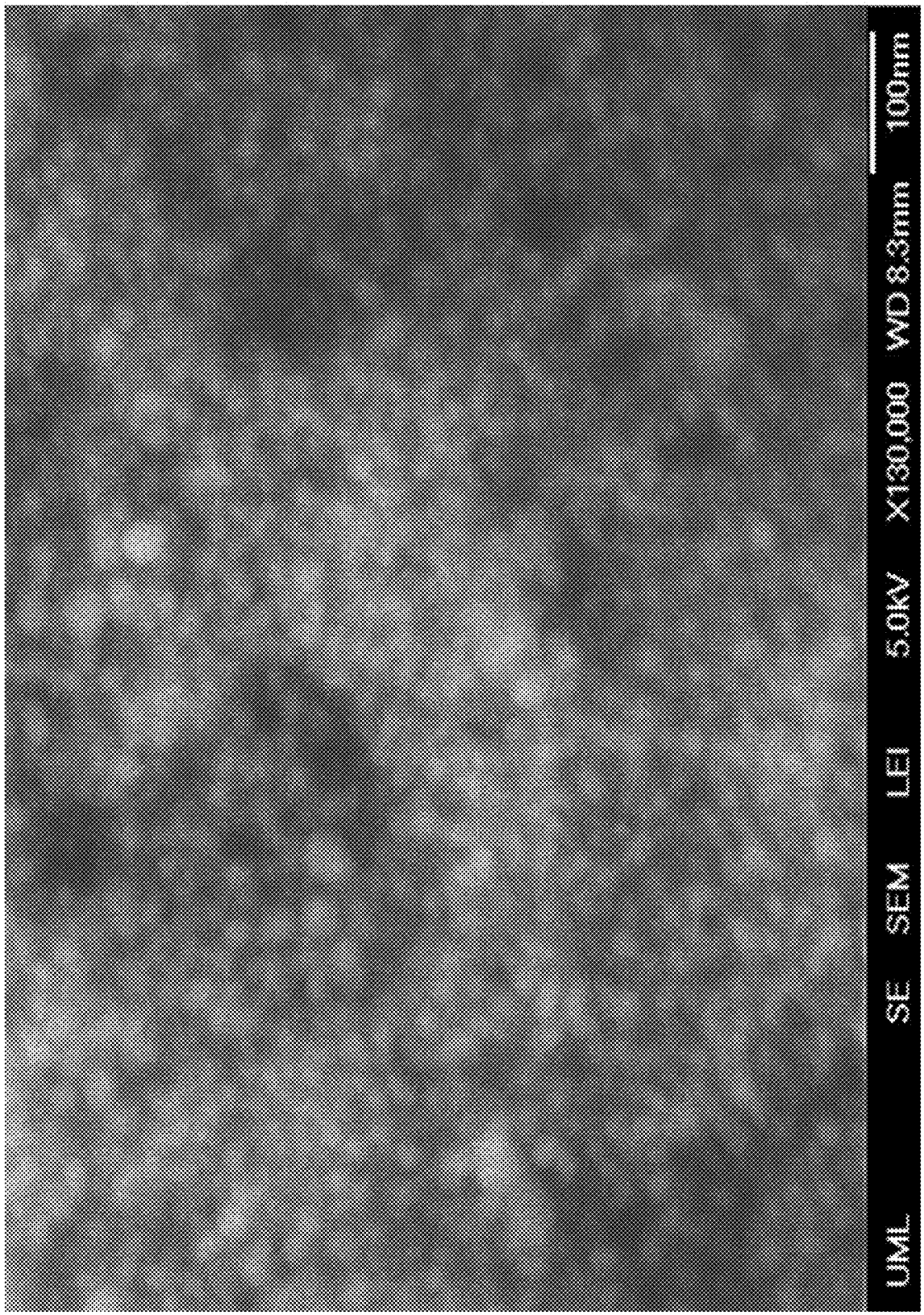
FIG. 22 is an SEM image of Sn/Ag nanosolder particles.

FIG. 22 is an SEM image of Sn/Ag nanosolder particles.

Figure 23:
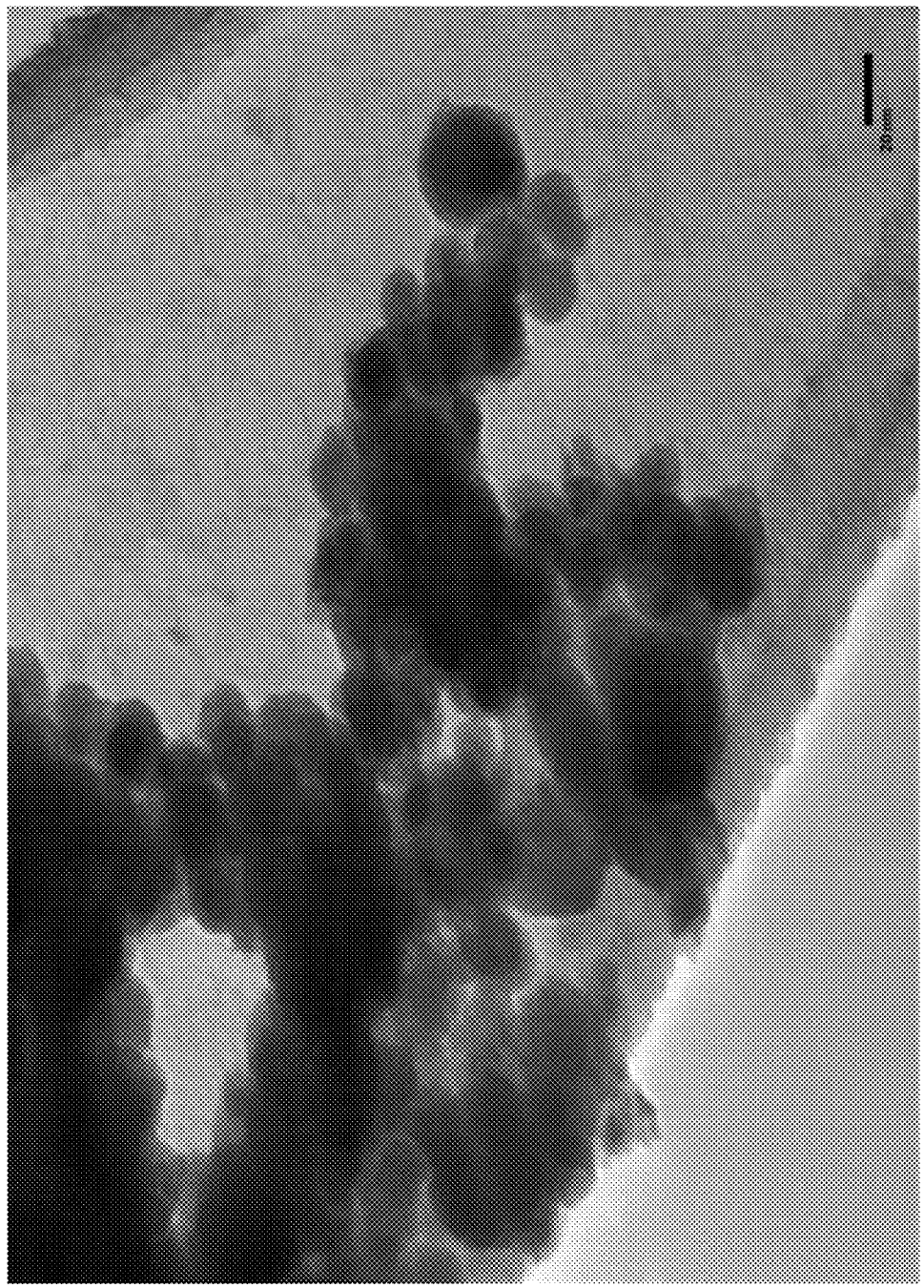
FIG. 23 is a TEM image of Sn/Ag nanosolder particles.

FIG. 23 is a TEM image of Sn/Ag nanosolder particles.

Figure 24A:
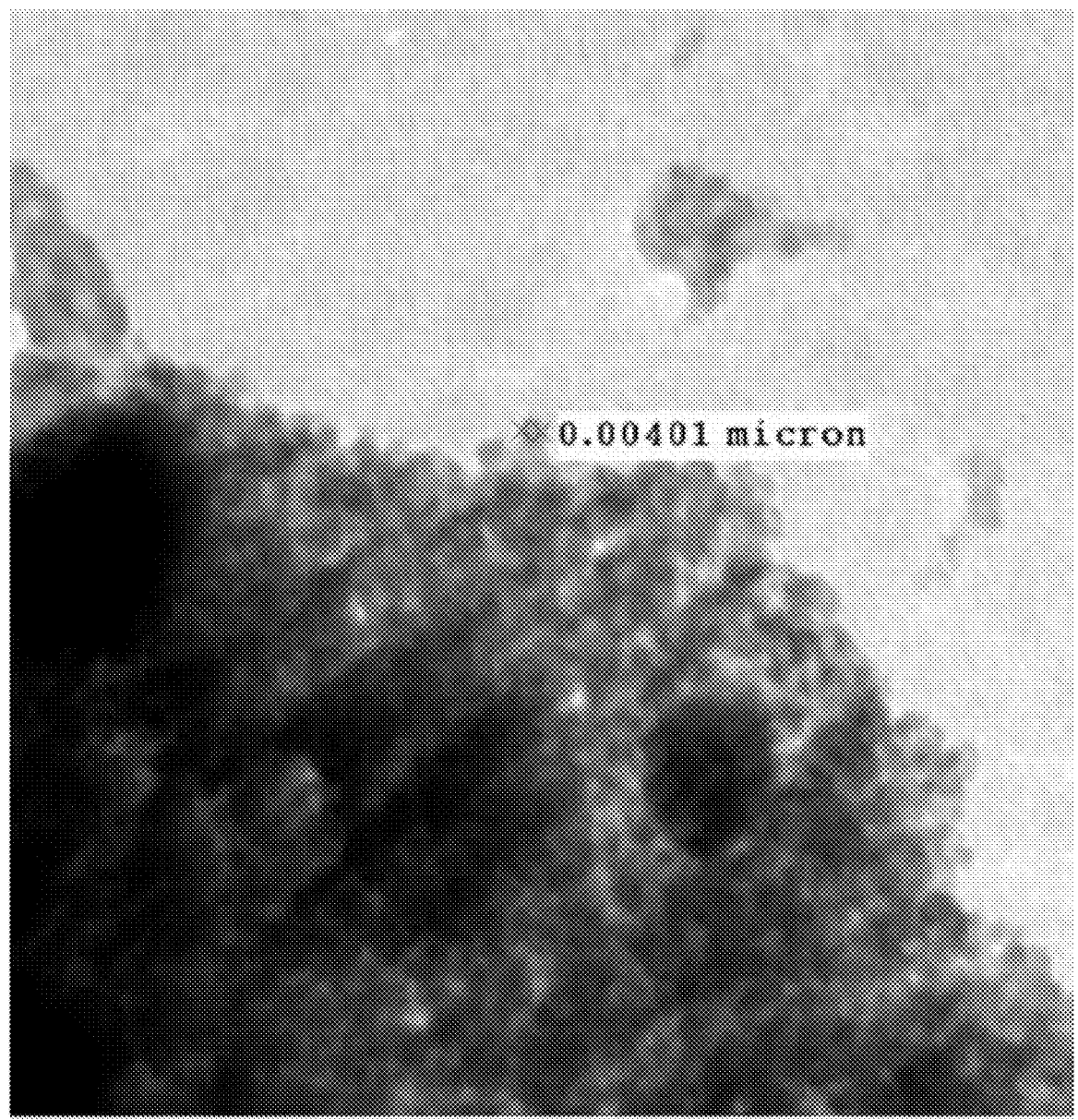
FIG. 24A is a TEM image of SAC nanoparticles showing particles smaller than 5 nm and particles in the 10-20 nm size range.

FIG. 24A is a TEM image of SAC nanoparticles showing particles smaller than 5 nm and particles in the 10-20 nm size range.

Figure 24B:
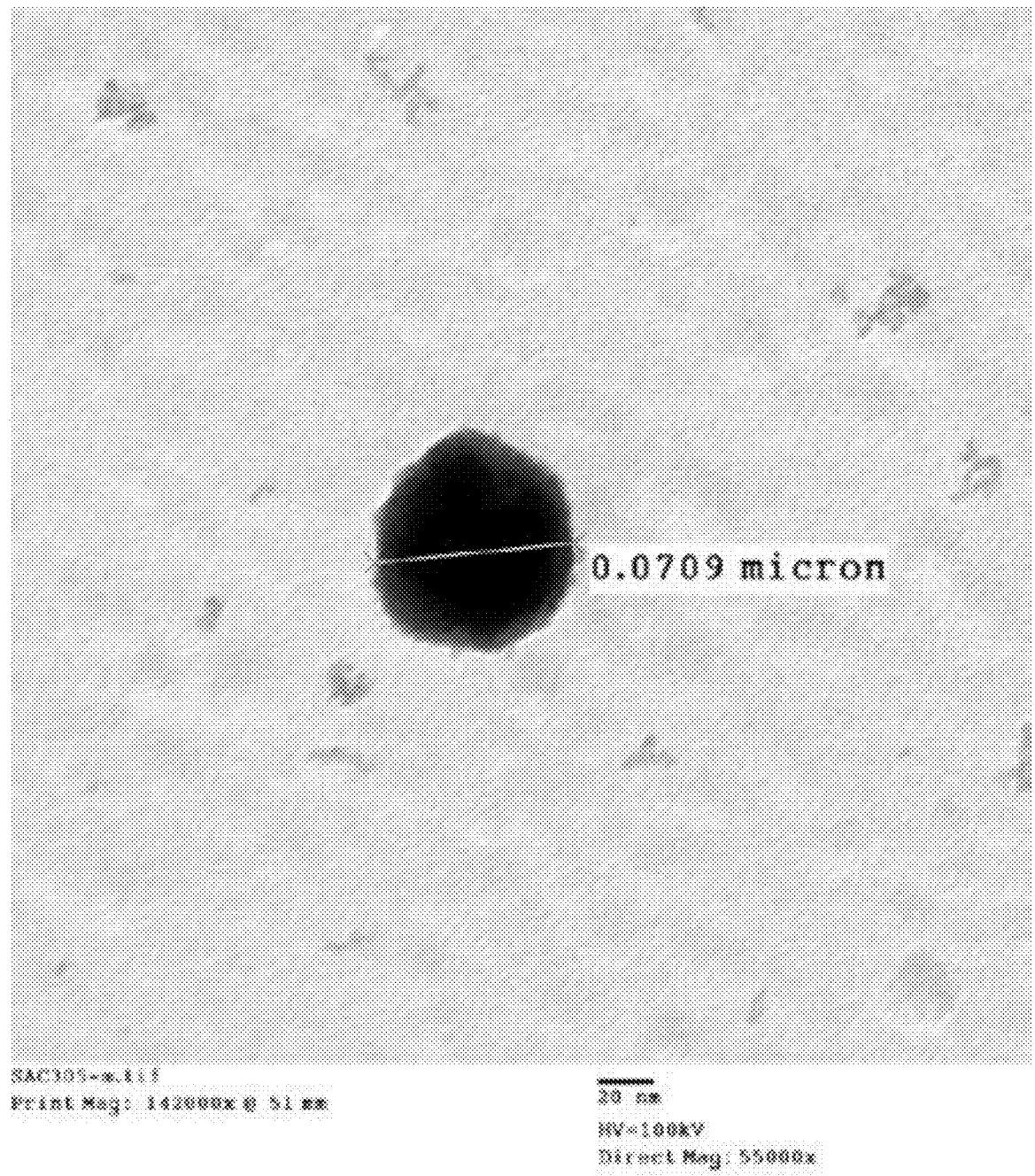
FIG. 24B is a TEM image of single nanoparticle with a measured size of 70 nm.

FIG. 24B is a TEM image of single nanoparticle with a measured size of 70 nm.

Shear Apparatus

Figure 25:
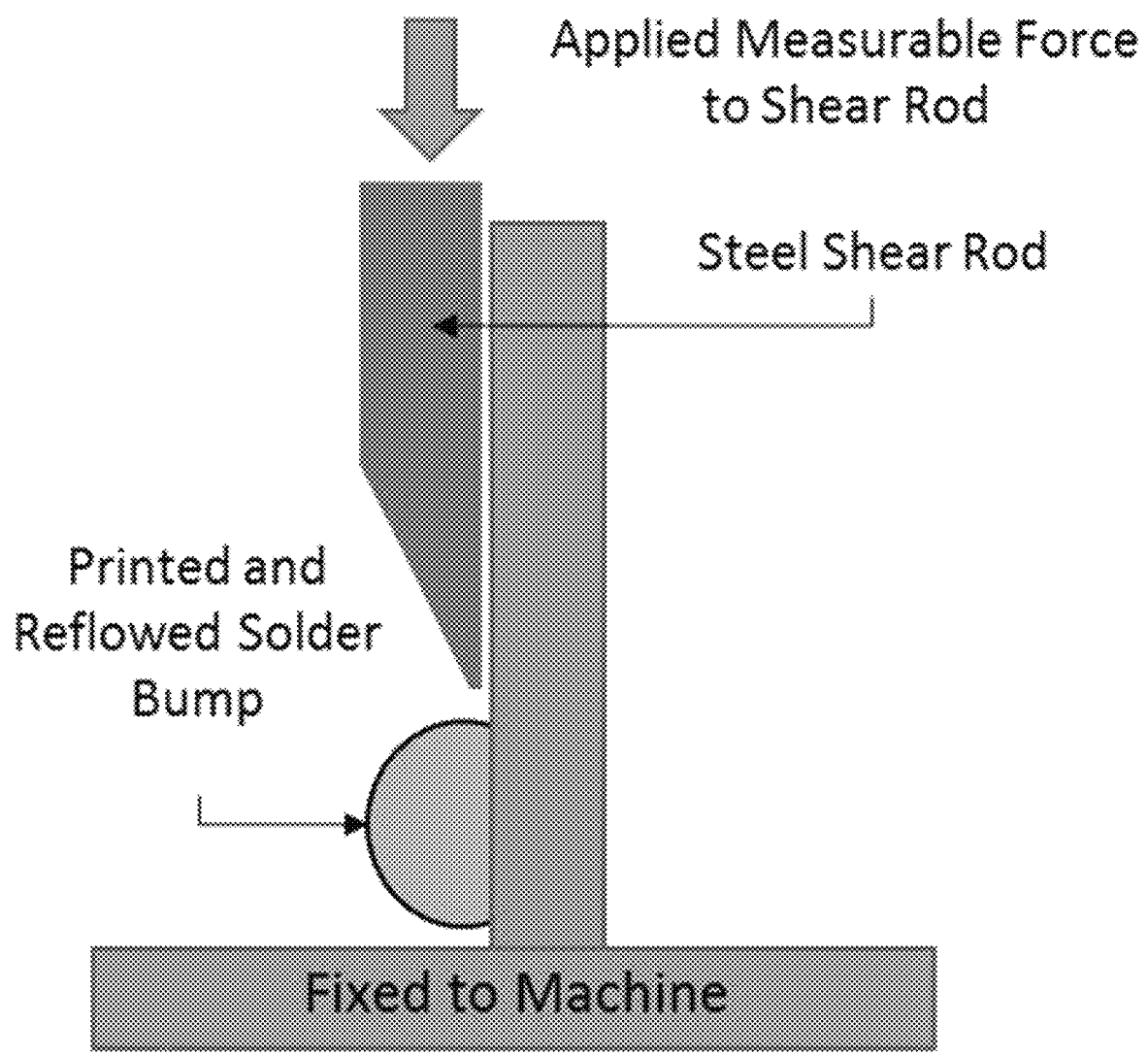
FIG. 25 is a schematic diagram of a setup used to measure shear forces required to shear solder bumps formed from nanocomposite solder paste.

FIG. 25 is a schematic diagram of a setup used to measure shear forces required to shear solder bumps formed from nanocomposite solder paste.

The mechanical property measurement methods of nanocomposite solder paste formed solder bumps were examined. The steel shear rod was designed for direct mounting on an Instron machine, and the tip of the rod varies the size in order to shear off single solder bump in different sizes.

Reflowed samples were subjected to shear testing. Each copper substrate was mounted one at a time into the shearing test block, shown in FIG. 25. The shearing rod was aligned so that its tip touched the copper substrate above the solder bump to be sheared. The rod was housed in the Instron load cell, which in turn was mounted on the Instron's uniaxial force-transmission arm. Firm contact was made between the shearing rod and the copper substrate. This measure was taken in order to prevent any looseness that might allow the shear rod to displace from the substrate and slide around the surface of the solder bump. The shearing test block was fixed securely to the base of the Instron by a fixing clamp, secured against motion in all directions. The load cell was then lowered, driving the shearing rod across the copper substrate and down onto a single solder bump protruding from it.

The velocity, or feed rate, at which the shear rod was lowered across the copper substrate was 0.2 in/min. Chosen at random from the left-most side to the right, eight solder bumps from each sample were sheared. A resistive force, created as the solder material fought the displacement of the shearing rod's tip, was measured by the load cell. This resistive force produced by each solder bump was recorded to a text file and saved.

Shear Data

Figure 26:
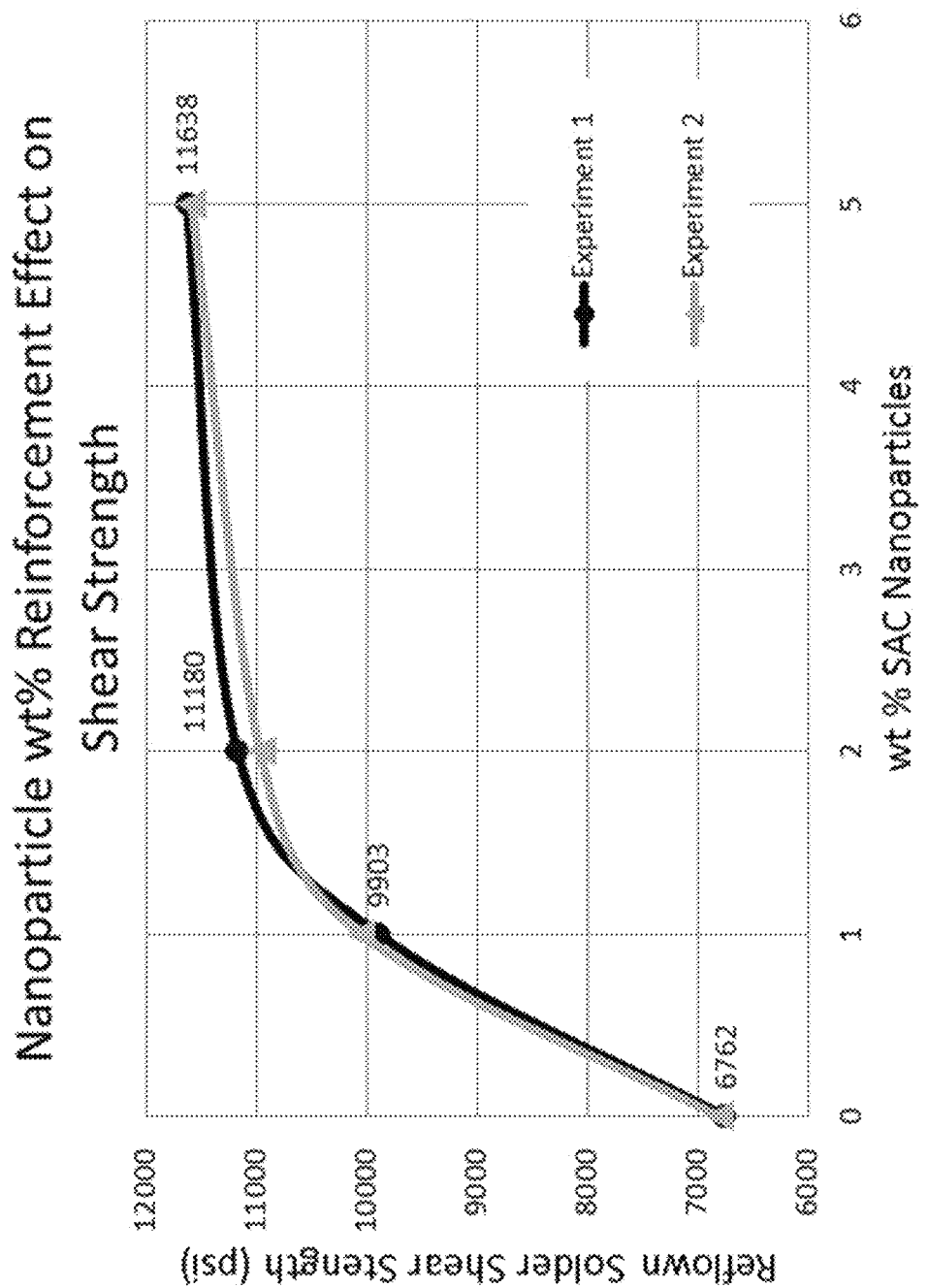
FIG. 26 is a graph of shear strength vs. weight percent SAC nanoparticles for solder joints formed by 5% reinforced nanocomposite solder paste, which shows a 70% increase compared to the typical microsolder formed solder paste.

FIG. 26 is a graph of shear strength vs. weight percent SAC nanoparticles for solder joints formed by 5% reinforced nanocomposite solder paste, which shows a 70% increase compared to the typical microsolder formed solder paste.

Nanosolder Bump Images

Figure 27:
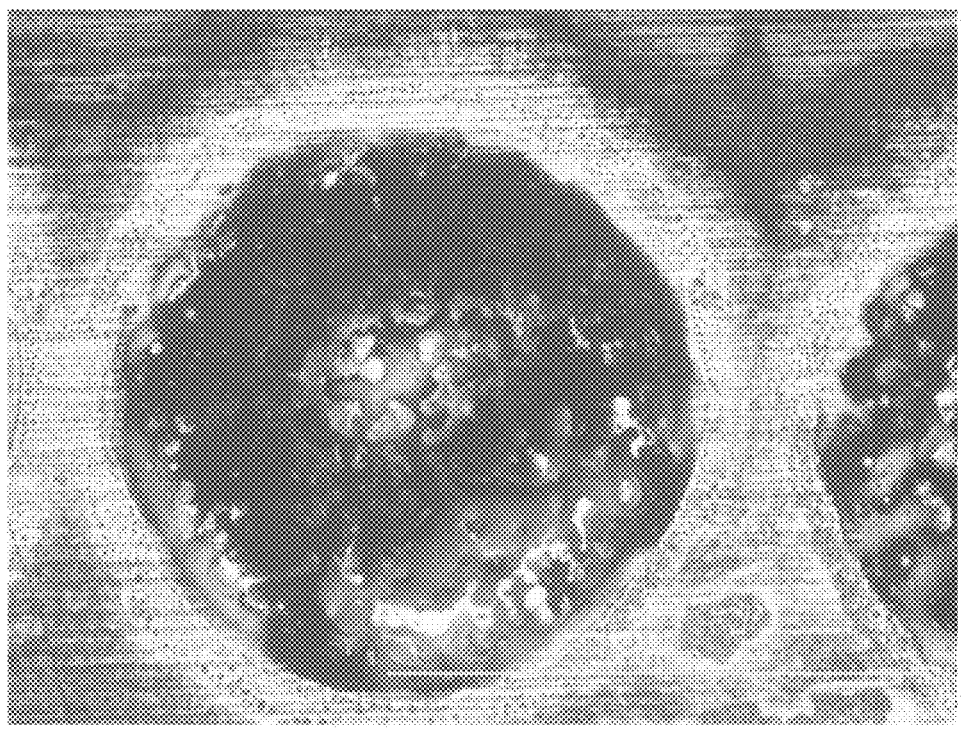
FIG. 27 is an optical image of Sn/Ag nanosolder paste after solder reflow.

FIG. 27 is an optical image of Sn/Ag nanosolder paste after solder reflow.

FIG. 28A is a perspective view of Sn/Ag nanosolder paste printed on the copper substrate through small featured stencil (14 mil/3 mil).

FIG. 28B is a close-up view of Sn/Ag nanosolder paste printed on the copper substrate through small featured stencil (14 mil/3 mil).

FIG. 28C is a close-up view of one Sn/Ag nanosolder bump formed after a reflow process.

Figure 29:
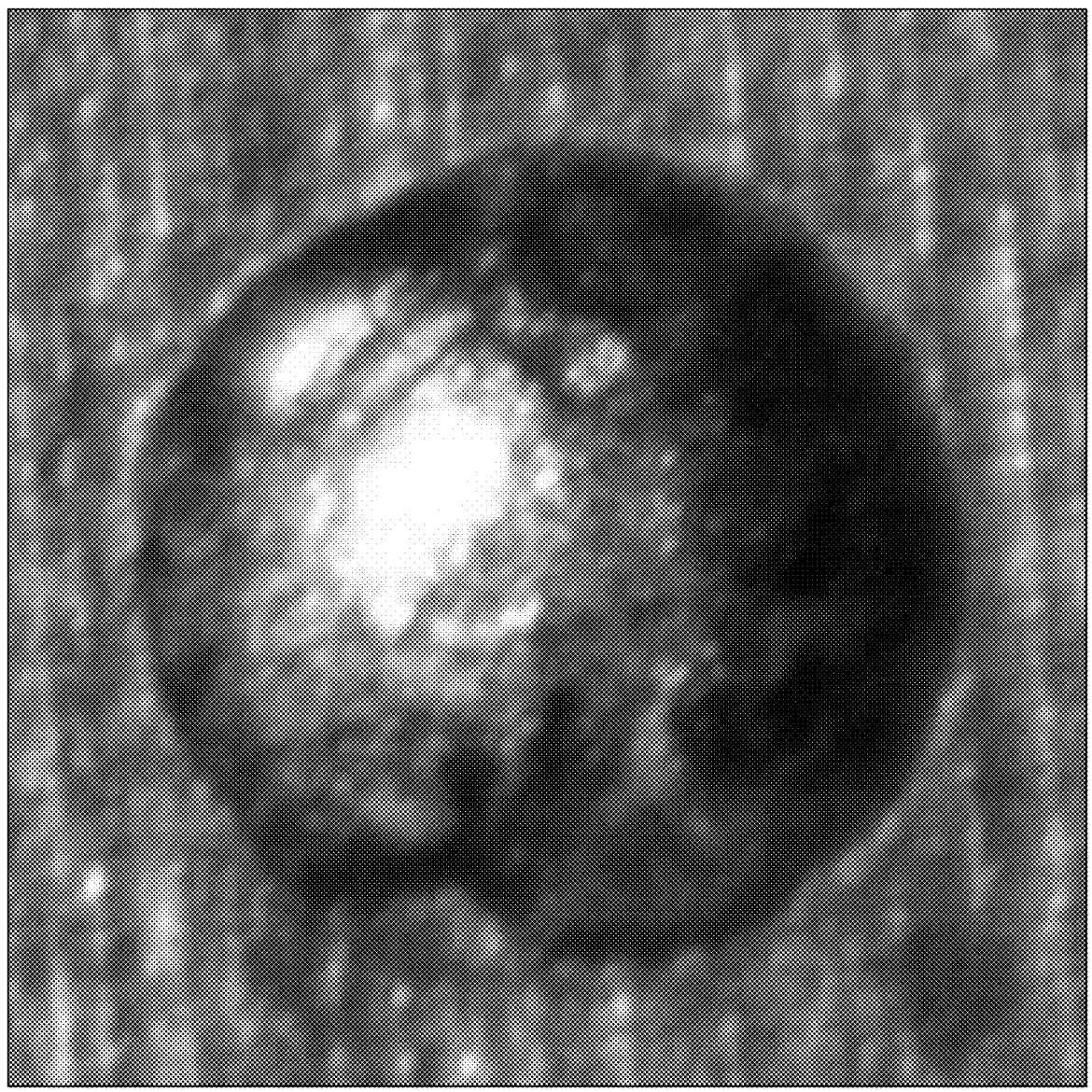
FIG. 29 is a top view image of a uniform solder bump formed by nanocomposite solder paste on a Cu substrate after the reflow processing. The shape of the solder bump formed by nanocomposite solder paste is the same as that formed by typical micro-sized solder paste.

FIG. 29 is a top view image of a uniform solder bump formed by nanocomposite solder paste on a Cu substrate after the reflow processing. The shape of the solder bump formed by nanocomposite solder paste is the same as that formed by typical micro-sized solder paste.

The prepared nanocomposite solder paste can be placed on the copper substrate though printing using a stencil and then reflowed in a solder reflow oven by following the temperature profile. The peak temperature of reflow process was 252° C., and the dwell time was controlled around 45 seconds. After reflow, the solder bump formed, as shown in FIG. 29.

Figure 30:
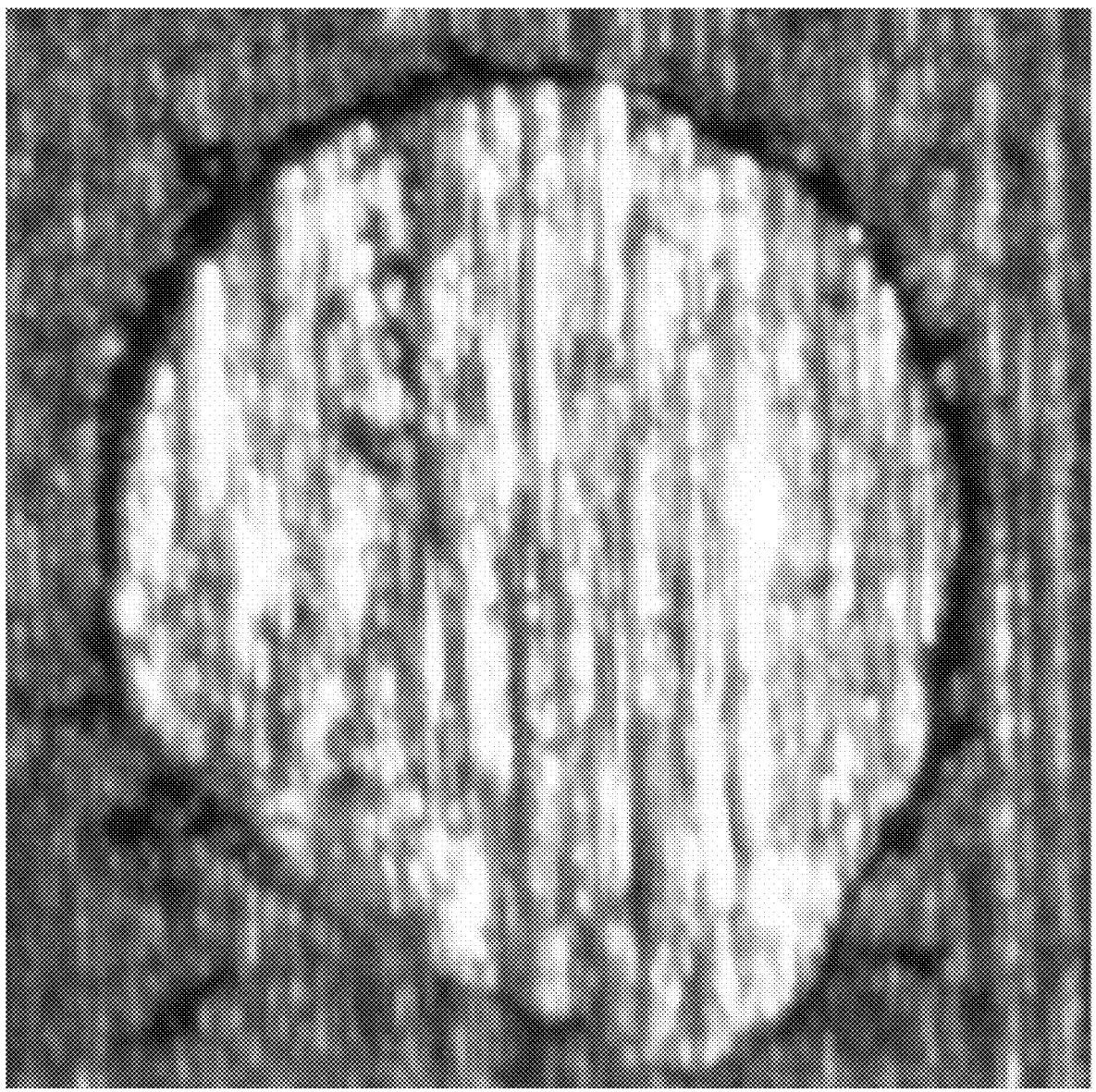
FIG. 30 is an image of solder shearing of the solder bump of FIG. 29 flush with the copper substrate.

FIG. 30A is an image of solder shearing of the solder bump of FIG. 29 flush with the copper substrate. Post-shear image capture provided high resolution surface contours of the shear faces of each solder bump. These images were referenced to judge the depth and completeness of shear. Some images revealed that solder bumps did not always shear at the face of the copper substrate (FIG. 30). All areas used in shear stress analysis were calculated using the post-shear diameters of the shear faces. Some bumps were not fully sheared through. These bumps were labeled as outliers and were omitted from shear stress calculations.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

INCORPORATION BY REFERENCE

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A composition of matter, consisting of
a particulate metallic solder alloy having particles of a single chemical composition of tin-silver-copper, said particles of said particulate metallic solder alloy having a bimodal size distribution in which particles in a smaller size range of said bimodal distribution have sizes in the range of 1-100 nanometers and particles in a larger size range of said bimodal distribution have sizes in the range of 2-75 microns, wherein said particles in said smaller size range are present in 0.5 to 10 weight percent, and
a flux.

2. The composition of matter of claim 1, wherein said flux is a halogen-free flux.

3. A composition of matter, consisting of:
a particulate metallic solder alloy having particles of a single chemical composition of tin-silver-copper, said particles of said particulate metallic solder alloy having a bimodal size distribution in which particles in a smaller size range of said bimodal distribution have sizes in the range of 1-100 nanometers and particles in a larger size range of said bimodal distribution have sizes in the range of 2-75 microns, wherein said particles in said smaller size range are present in 0.5 to 10 weight percent,
a flux, and
a solvent.

* * * * *